United States Patent

[11] 3,622,706

| [72] | Inventor | Meguer Kalfaian<br>962 Hyperion Ave., Los Angeles, Calif. 90029 |
|---|---|---|
| [21] | Appl. No. | 828,067 |
| [22] | Filed | Apr. 29, 1969 |
| [45] | Patented | Nov. 23, 1971 |

[54] PHONETIC SOUND RECOGNITION APPARATUS FOR ALL VOICES
10 Claims, 17 Drawing Figs.

| [52] | U.S. Cl. | 179/15 A |
|---|---|---|
| [51] | Int. Cl. | G10l 1/00 |
| [50] | Field of Search | 179/15 A, 15 B |

[56] References Cited
OTHER REFERENCES

J. L. Flanagan, Speech Analysis Synthesis and Perception, 1965, p. 12 and 152.

*Primary Examiner* — Kathleen H. Claffy
*Assistant Examiner* — Jon Bradford Leaheey ABSTRACT: A phonetic sound analyzing system in which groups of resonance peaks which have specific frequency and amplitude ratios are selected from a frequency region above the glottal pitch and vocal cord fundamental frequencies and are representative of phonetic information.

Fig. 16

CHANNEL OUTPUT POSITION SHIFTING ARRANGEMENT

SIMULATED BLOCK DIAGRAM DEPICTING THE LEARNING PROCESS OF THE BRAIN

BLOCK ARRANGEMENT SIMULATING ANALITICAL FUNCTION OF THE BRAIN

ARRANGEMENT FOR CANCELLING OUT PITCH & FUNDAMENTAL FREQUENCIES FROM VOICE

FROM PHASE INVERTERS 184, 181, 183 IN FIG. 9

FREQUENCY LOCATION SHIFTING ARRANGEMENT

Fig. 12

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| 1 | 4 | 6 | 8 | 9/10 | 11 | 12 | 13 | 14 | 14/15 | 15 | 15/16 | 16 | 17 | 17/18 | 18 | 18 | 18 | 19 | 19/20 | 20 | 20 | 20 | 20/21 | 21 | 21 | 21/22 | 22 | |
| 2 | 5 | 8 | 10 | 11 | 12/13 | 14 | 14/15 | 15 | 16 | 17 | 17/18 | 18 | 18 | 19 | 19 | 19/20 | 20 | 20/21 | 21 | 21/22 | 21 | 22 | 22/23 | 23 | 23 | 23 | 23/24 | |
| 3 | 7 | 9/10 | 11/12 | 14 | 15 | 15/16 | 16 | 17/18 | 18 | 19 | 19 | 20 | 20/21 | 21 | 21 | 22 | 22/23 | 23 | 23 | 23/24 | 23/24 | 24 | 24 | 24/25 | 25 | 25 | 25/26 | |
| 4 | 8 | 11 | 14 | 15 | 16 | 17 | 18 | 19 | 19/20 | 20/21 | 21 | 22 | 22 | 22/23 | 23/24 | 23/24 | 23/24 | 24 | 24/25 | 24/25 | 25 | 25/26 | 26 | 26 | 26 | 26/27 | 27 | |
| 5 | 10 | 13 | 14/15 | 16 | 17/18 | 18 | 19/20 | 20/21 | 21 | 21/22 | 22/23 | 23 | 23/24 | 23/24 | 24 | 24/25 | 25 | 25/26 | 25/26 | 26 | 26/27 | 27 | 27/28 | 27/28 | 28 | 28 | | |
| 6 | 11 | 14 | 15/16 | 17 | 18 | 19/20 | 20/21 | 21 | 22 | 23 | 23/24 | 23/24 | 24 | 25 | 25/26 | 25/26 | 26 | 26 | 27 | 27 | 27/28 | 28 | 28 | 28 | 28/29 | 29 | 29 | |
| 7 | 12 | 14/15 | 16/17 | 18 | 19/20 | 20/21 | 21/22 | 22/23 | 23 | 23/24 | 24 | 24/25 | 25/26 | 25 | 26 | 26/27 | 27 | 27/28 | 28 | 28 | 28 | 28/29 | 30 | | | | | |
| 8 | 13 | 15 | 17/18 | 19 | 20 | 22 | 22/23 | 23/24 | 24 | 24/25 | 25 | 25/26 | 26 | 26/27 | 27 | 27/28 | 28 | 28/29 | 28/29 | 28/29 | 29 | 30 | | | | | | |
| 9 | 14/15 | 16/17 | 19 | 20/21 | 22 | 23 | 23/24 | 24/25 | 25 | 25/26 | 26/27 | 27 | 27/28 | 28 | 28/29 | 29 | 30 | | | | | | | | | | | |
| 10 | 15 | 18 | 20 | 21/22 | 23 | 24 | 25 | 25/26 | 26 | 27 | 27/28 | 28 | 28/29 | 29 | 30 | | | | | | | | | | | | | |
| 11 | 15/16 | 18 | 21 | 22/23 | 23/24 | 24/25 | 25/26 | 26 | 27 | 27/28 | 28 | 29 | 30 | | | | | | | | | | | | | | | |
| 12 | 16/17 | 19/20 | 22 | 23/24 | 24 | 25 | 26 | 27 | 28 | 29 | 30 | | | | | | | | | | | | | | | | | |

CHANNELS (→)

DETECTED FILTER OUTPUTS SHIFTED IN CHANNEL POSITIONS (↑)

Fig. 11

SUB-BAND FREQUENCIES

| 1 | $f_1$ = .12 KC | 10 | $f_{10}$ = .65 KC | 19 | $f_{19}$ = 2.3 KC |
|---|---|---|---|---|---|
| 2 | $f_2$ = .15 KC | 11 | $f_{11}$ = .73 KC | 20 | $f_{20}$ = 2.6 KC |
| 3 | $f_3$ = .2 KC | 12 | $f_{12}$ = .84 KC | 21 | $f_{21}$ = 3 KC |
| 4 | $f_4$ = .25 KC | 13 | $f_{13}$ = .96 KC | 22 | $f_{22}$ = 3.45 KC |
| 5 | $f_5$ = .3 KC | 14 | $f_{14}$ = 1 KC | 23 | $f_{23}$ = 3.9 KC |
| 6 | $f_6$ = .35 KC | 15 | $f_{15}$ = 1.3 KC | 24 | $f_{24}$ = 4.8 KC |
| 7 | $f_7$ = .4 KC | 16 | $f_{16}$ = 1.5 KC | 25 | $f_{25}$ = 5.4 KC |
| 8 | $f_8$ = .46 KC | 17 | $f_{17}$ = 1.7 KC | 26 | $f_{26}$ = 6.5 KC |
| 9 | $f_9$ = .56 KC | 18 | $f_{18}$ = 2 KC | 27 | $f_{27}$ = 7.3 KC |
| | | | | 29 | $f_{28}$ = 8.5 KC |

INVENTOR

Fig. 13

CHANNEL OUTPUT POSITION SHIFTING SEQUENTIAL DISTRIBUTOR

SIGNAL DECODING ARRANGEMENT

SIGNAL DETECTING ARRANGEMENT

INVENTOR

PHONETIC SOUND RECOGNITION APPARATUS FOR ALL VOICES

The present invention relates to phonetic sound recognition, and more particularly to the analysis and recognition of spoken phonetic sound waves which are uttered under different environmental conditions by different speakers. The main object of the present invention is to provide a functional operation by a speech-recognizing automata that will represent a close simulation of the analytic function of the human brain, so that analysis of phonetic sounds as uttered by different speakers may be made as closely accurate as by the human brain. The full realization of an ultimate model, however, depends upon sufficient knowledge on how the brain performs such analysis. Accordingly, the present disclosure is contemplated to be a theoretical advancement over prior teachings of human communications. The methods and processes herein presented are then based on this theoretical foundation, which is to perform a practical recognition of phonetic sounds heretofore made impossible by previous proposals.

It is a true fact that the human brain is the only known mechanism that can intelligently analyze and interpret presented information in the highest perfection that any man-made mechanism can ever be made to perform. It is also true that the mysteries of the extremely complex functions of the interpretive mechanism of the brain are not fully understood in the modern science, and therefore, each new contribution to the understanding of these mysteries must be considered as either an augmentation to the previous knowledge, or, a correction of some errors that might have been made in previous teachings. As these new teachings come forth by more accurate analytical explanations and by more advanced experimental proofs, new inventions must also follow to facilitate building of a phonetic sound recognition device, as a simulation model of the brain mechanism. Accordingly, the novelty of the present invention will be distinguished from previous proposals by first understanding theoretically which of the wave components in an uttered phonetic sound represent the phonetic sound, as determined by the human brain; and second, by the novel methods and means that are disclosed herein for the process of selecting only those wave components that represent a phonetic sound, for final analysis and interpretation in some secondary form. It has been the lack of this theoretical knowledge that previously designed devices for speech recognition have failed performance as accurately as the human brain does. Prior to describing both the theoretical and physical aspects of the present invention, however, I will emphasize the extremely important significance of the pitch and fundamental frequency waves which are involved in the analytical process of phonetic sound recognition. For this reason, I will attach specific meaning to these two terms throughout the theoretical specification and claims, rather than using them synonymously, as has been commonly used in the prior language of speech phenomena. Thus in order to avoid any distortion of these often used two terms in my present disclosure, and to familiarize the reader with my specific concept to speech phenomena, I will label the term "pitch frequency" as glottal pitch frequency, and the "fundamental frequency" as vocal cord fundamental frequency, for the following brief of experimentally established reasons:

According to a mirror-type arrangement of experimental observation, Flanagan describes that puffs of air are passed through the opening and closing action of the glottis, and enter the mouth cavities for acoustic excitation of different resonances. In a relaxed state, such as in whispered speech, the folds of the vocal cords are open (separated from each other), and accordingly the glottal puff of air are freely passed on to the acoustic system of the mouth, and the frequency of these puffs of air is called the pitch frequency. When the folds of the vocal cords are drawn together by muscle contraction, however (such as in voiced speech), they are forced into oscillation (closing and opening of the folds), and the frequency of glottal air puffs is augmented by the oscillating vocal cord air puffs. As explained by Flanagan, the mass and compliance of the cords, and the subglottal pressure, essentially determine the period of oscillation of the vocal cords. In reference to the terminology used, however, Flanagan does not attach the term "fundamental" to the oscillating frequency of the vocal cords, but rather, uses both "pitch" and "fundamental" as having synonymous meaning —probably because, he also states that the voice pitch has yet to be adequately defined.

Referring to the Mathes explanation in his U.S. Pat. No. 2,562,109, he differentiates between the pitch and fundamental frequencies by saying that the fundamental frequency is generated by the vocal cords. At the same time, however, he uses the terms pitch and fundamental frequencies synonymously—probably also for the same reason that Flanagen had stated.

According to the terminology used in the explanations of Flanagan and Mathes, the terms "pitch" and "fundamental" have been synonymous. But because of the extreme importance in differentiating between the generations of these two different frequencies that I have established in my theoretical explanation, I will explain by way of the graphical illustrations in FIG. 2 why in the previous terminology the use of these two terms has been synonymous. For example, referring to the graphs at $H$, $I$ and $J$, I have recorded the phonetic sound "$\overline{oo}$" (with my Visicorder) of a single voice in three different muscularly controlled tensions imposed upon his vocal tract (glottis and vocal cord). As I have designated in these graphs, the periods between the glottal (pitch) and vocal cord (fundamental) puffs, the frequency between the pitch and fundamental varies widely in the first graph $H$. In the second graph $I$, as the speaker raises the pitch and fundamental frequencies of his voice, by imposing forceful muscular tension upon his vocal tract, the difference between the pitch and fundamental frequencies becomes lesser than in the first case. In the third stage at $J$, the speaker imposes maximum muscular tension upon his vocal tract, and in this case, both the glottal (pitch) and vocal cord (fundamental) frequencies resolve into a single frequency. Thus in reference to the actual demonstration of the physical properties for generating pitch and fundamental frequencies, the following conditions may exist in ordinary speech:

1. In whispered speech, only the glottal pitch frequencies are present.
2. In voiced speech, both the glottal pitch and vocal cord fundamental frequencies are present—the fundamental being generated at a higher frequency than the pitch frequency.
3. In voiced speech, both the glottal pitch and vocal cord fundamental frequencies are present—but both frequencies are generated at the same frequency with in-phase relationships.

Following the illustrative demonstration of FIG. 2, it is seen that the pitch and fundamental frequencies are not always differentiable, and it is exactly for this reason that the terms pitch and fundamental have been used synonymously in the prior art. In fact, it is for this reason that previous attempts in making speech recognition automata have failed, because those wave components that actually represent the phonetic sound have been analyzed in conjunction with the pitch and fundamental frequency waves, with the assumption that their characteristically large amplitude peaks must constitute as integral parts of the phonetic information. Whereas, I will explain in my presently disclosed theoretical analysis that these large peaked waves are only timing waves (for the brain to perform analysis), and not as integral parts of the phonetic information.

As I have stated in the foregoing, the science of speech phenomena is a slow progress of advancement. For example, in my patent applications Ser. No. 452,737 May 3, 1965 (now U.S. Pat. No. 3,432,617 Mar. 11, 1969); and Ser. No. 488,075 Sept. 17, 1965; and Ser. No. 488,171, 1965 (both of which were to be issued, but now abandoned), I had described that the "pitch" frequency wave represents as a timing wave, but the fundamental frequency constitutes as an integral part of the phonetic sound. Whereas in the present disclosure, I contemplate to describe my final analysis as an ultimate understanding of the characteristic nature of phonetic sounds, showing that the frequency region of any group of resonances that collectively represent a phonetic sound lies above the vocal cord fundamental frequency, and that both the pitch and fundamental frequencies represent only timing waves (or periods, within which the process of analysis occurs), plus additional effects for differentiating between characteristically different voices of different speakers.

In reference to the terminology to be used herein, accordingly, I will use glottal pitch frequency referring to the frequency of air puffs passing through the closing and opening action of the glottis, and vocal cord fundamental frequency referring to the oscillating (closing and opening) action of the vocal cords, throughout the theoretical description and in the claims, but omit using the subjects preceding these terms in the drawings and in the specification of the drawings, as extra wording is not necessary, since also, the reader will be familiar with the terminology I have used herein. Thus the purpose of the following theoretical analysis of the interpretive mechanism of the human brain is to facilitate understanding of the true substance of the present disclosure, and to distinguish from others the novel invention that is claimed herein for a practical model of phonetic sound recognition.

Figure 7:
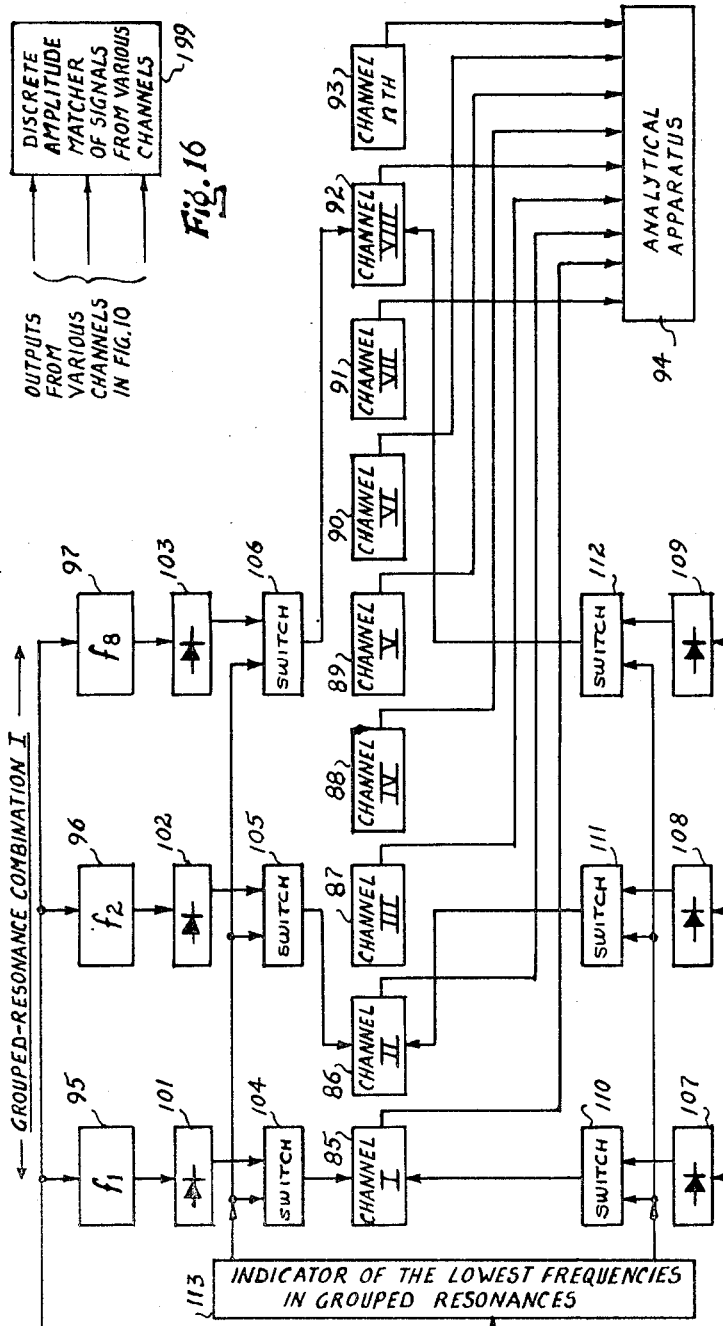
Figure 8:
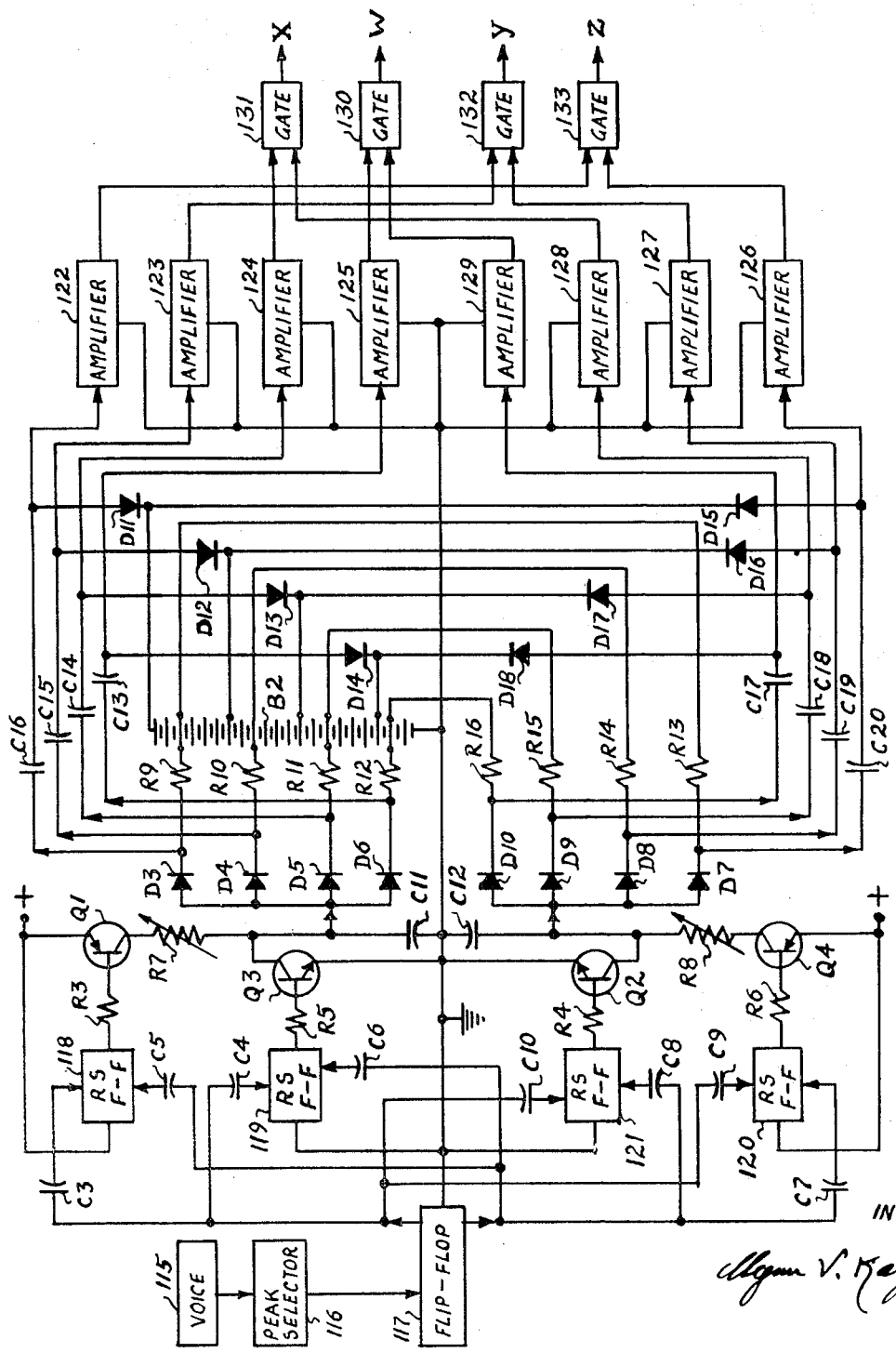
Figure 9:
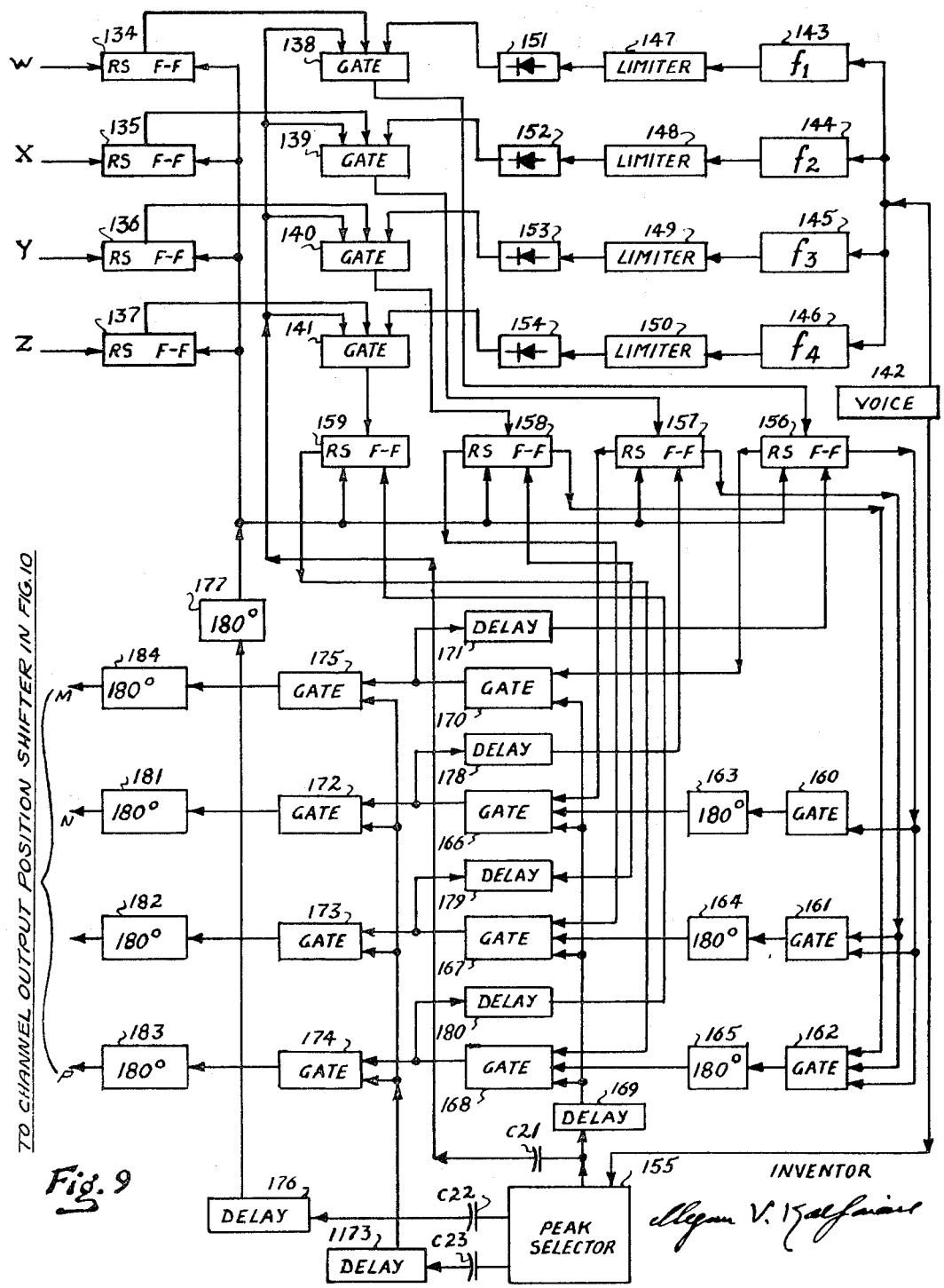
Figure 10:
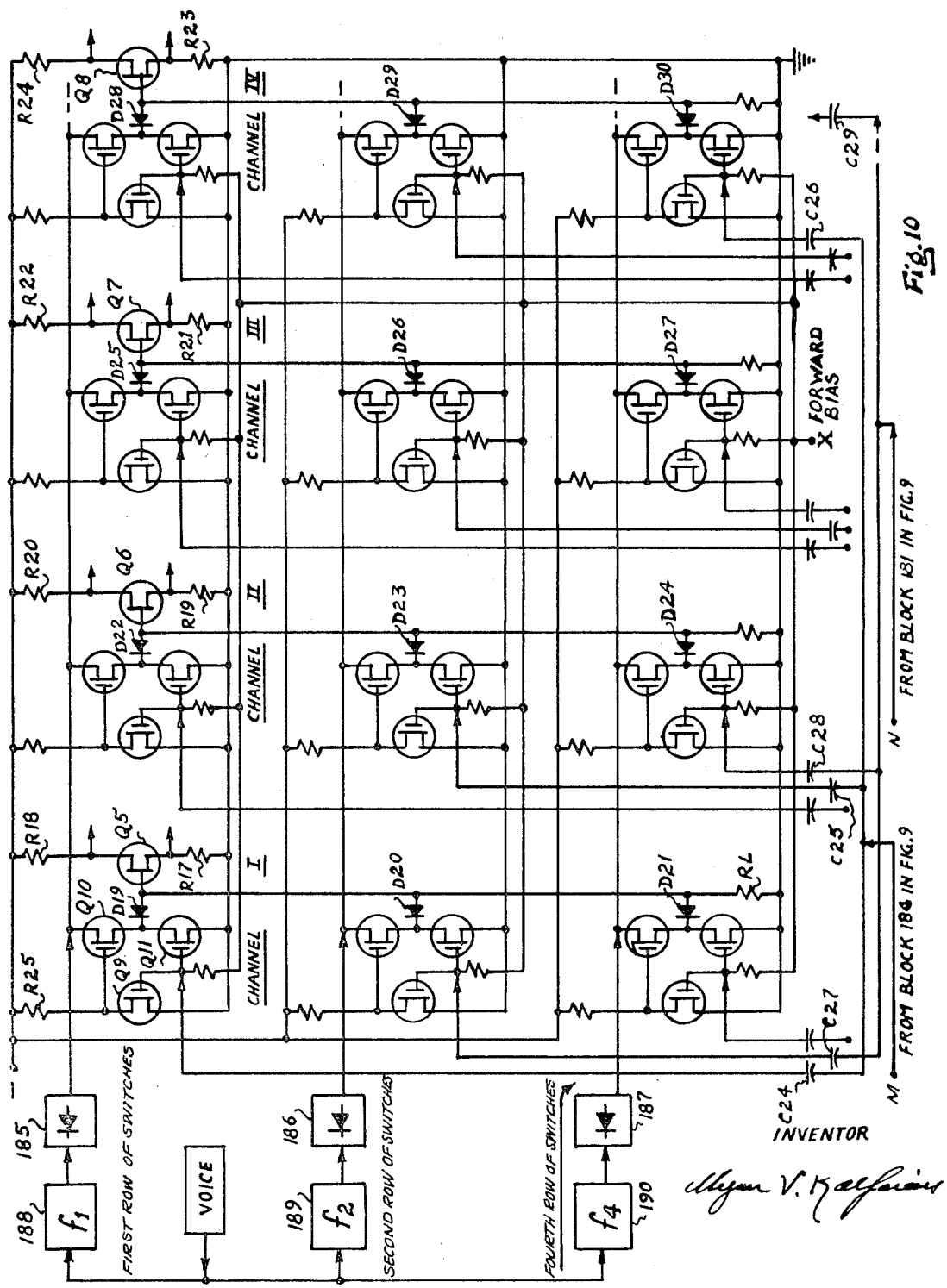
Figure 15:
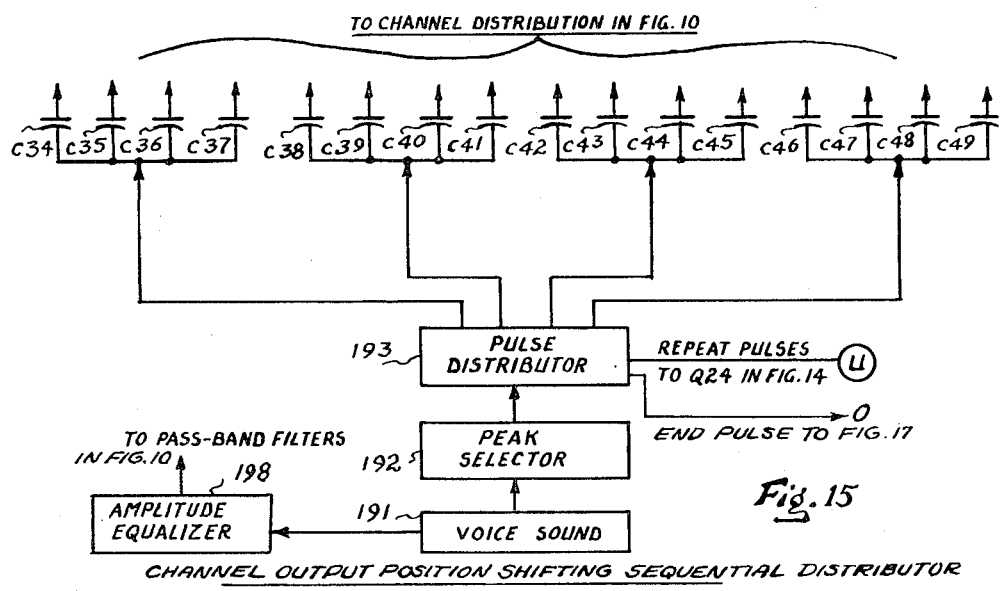
Figure 14:
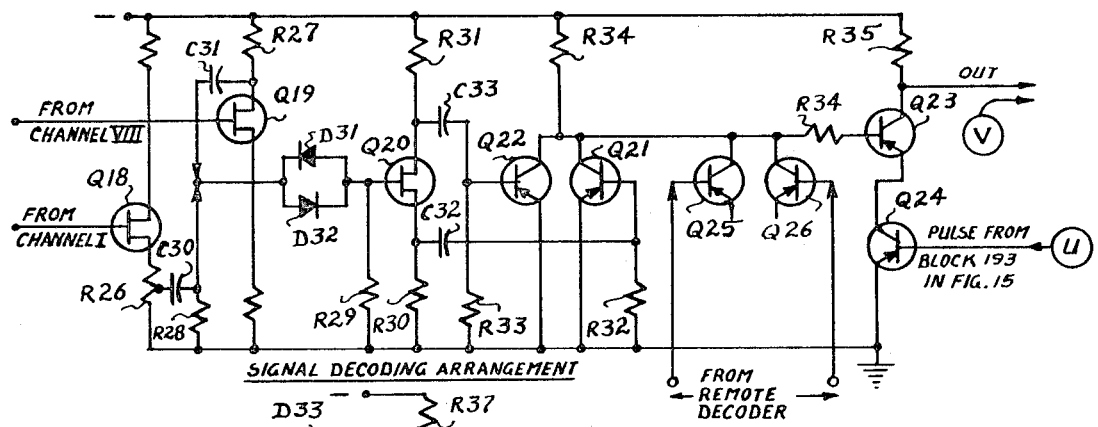
Figure 17:
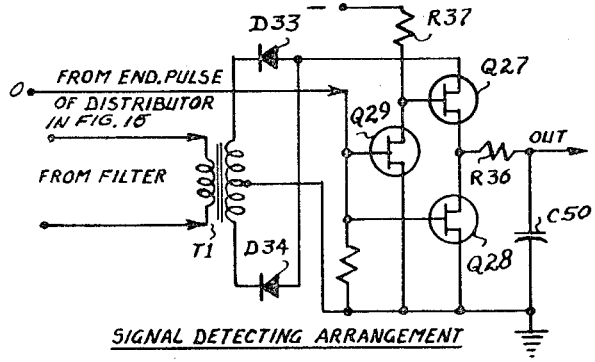

FIG. 7 is a block diagram of a numerically arranged channels to which are applied a group of signals (as derived from subbands of the sound) in such combinations that the signal derived from the subband having the lowest frequency in the group is applied to the first of the channels and the other signals in the group are applied to channels that differ numerically by the same factor of multiplication as the other frequencies in the original group differ from the frequency of the signal having the lowest frequency in the group according to the invention;

FIGS. 8 and 9 are part arrangements for a complete switching system of selecting and removing the pitch and fundamental frequency components for the phonetic sound wave, and determining the next higher frequency component of the phonetic sound wave, in accordance with the invention;

FIG. 10 is a switching arrangement representing the channels in FIG. 7, according to the invention;

Figure 13:
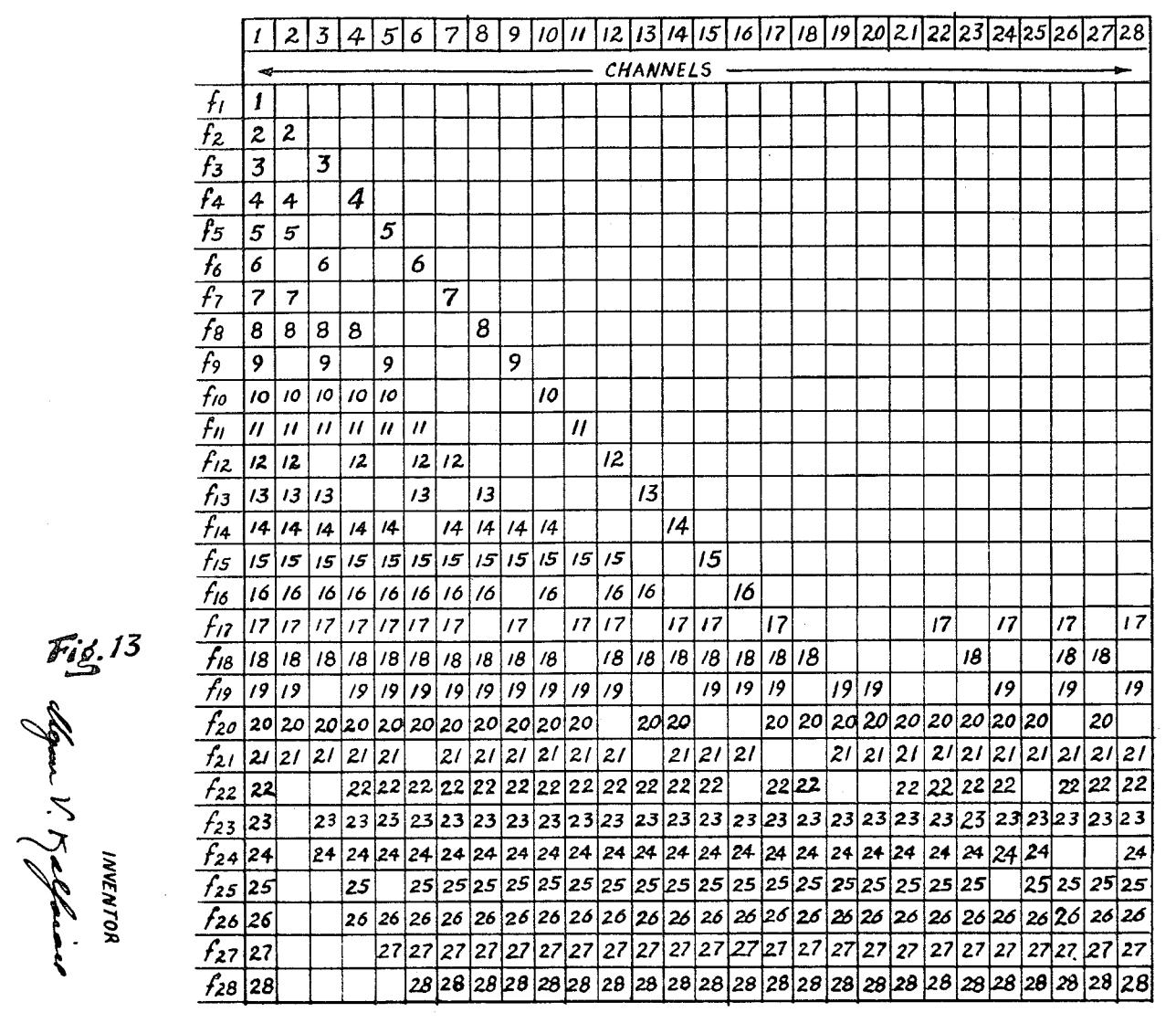

FIGS. 11, 12 and 13 are numerical charts showing how groups of original signals derived from subbands of the sound are regrouped in different combinations to the channel inputs in FIG. 7, according to the invention;

FIG. 14 is a signal decoding arrangement, according to the invention;

FIG. 15 is a pulse distributing arrangement for operation in conjunction with FIG. 10, according to the invention;

FIG. 16 is a block diagram of a conventional signal decoding system as a reference to the invention; and FIG. 17 is a signal detecting system according to the invention.

CONSTANT AND VARIABLE VALUES OF INFORMATION

Since the present invention relates to simulating the human brain in interpreting intelligent information, we must first divide this information into two distinct catagories; the first being a constant value, and the second being a variable or quality value. For example, a phonetic sound, as spoken by different speakers, both male and female, has a constant value (the same phonetic sound), but characteristically different in qualities, because of pitch, fundamental, laringeal, and environmental changes. The processes of recognizing these informations, whether it be visual, thought, or phonetic values, must follow definite patterns, because we know through experience that the final interpretation of these informations by different individuals does not change. For example, when a number of speakers articulate a certain phonetic sound, the listener's brain will interpret each one of the sounds as having the same phonetic value, but each one of them having a distinct quality value distinguishable from the others. We may then refer to the phonetic value as being constant; and the quality value as being variable. In furtherance, and referring to the constant values, each one of these values are divided into its basic component parts, or the rudiments, as the case may be. For example, a thought of constant value may be represented by a spoken sentence using only the basic component parts, such as "I went skating." The brain needs only to know if the basic component parts are present, such as, an action that has been started, the subject that has started it, and a reason for it. In the given sentence, the brain recognizes the subject as being "I," the action as being "went," and the reason as being "skating." Each one of these parts may then be assigned a coded signal value, so that when all three are present simultaneously, a process of coincidences with prestored values will develop into final recognition, which by itself may be represented as a master coded signal. Since each one of these three basic component parts must necessarily be present for conveying the complete thought, even if their sequences are mixed, and whether a series of assertions follow depending on a leading affirmation, or a series of affirmations follow dependent of each other, their distinct signal values will first be translated into a coded master signal as an interpretation of the constant value, and the remaining values as the variants. This is also true for sound wave interpretation, which may be explained as in the following:

SOUND INTERPRETATION

The process of sound interpretation is exactly similar to the above given basic process, even though the physical behavior of signal conversion inherently differs one from the other. For example, the rudiment of a sound is an eventful phenomena that represents motion. The time period from inception to termination of this motion represents half the wavelength of a specific frequency. Thus in reference to the physiological aspects of the human brain, the sensory cells (hair cells) on the wall of the cochlea will each respond to a motion of particular frequency (due to physical relationship along different points of the basilar membrane through a complex of tissues in the organ of corti) when fluid pressure at that frequency is induced across the cochlea. The stimulus from any one, or a plurality of these cells are transmitted to the auditory area of the cerebrum cortex (this will be described further in more detail) through the eighth cranial nerve, as a primary electrical excitation, from which point individual electrical impulses are conveyed to the surrounding matrix of memory cells for comparative coincidence. At the end of this primary excitation, a coincidental comparison is established, and sensation results of having recognized the sound. Thus for continuous sine wave, there is continuous sensation of having heard and recognized the sound, but 180 degrees time lagging with respect to the original, because interpretation starts only after the eventful phenomena has taken place and completed. In the event that this sine wave contained harmonic waves, then the first would be considered as the fundamental wave, and the harmonics as some extraneous component parts that are carried over the fundamental. In this case, the wave would be considered as a complex wave. But the brain still interprets it as a representation of the original sine wave, plus some component waves, the combination of which adds some characteristic effect thereto.

RESONANCE CELLS IN THE SOUND SYSTEM OF THE BRAIN

Figure 1:
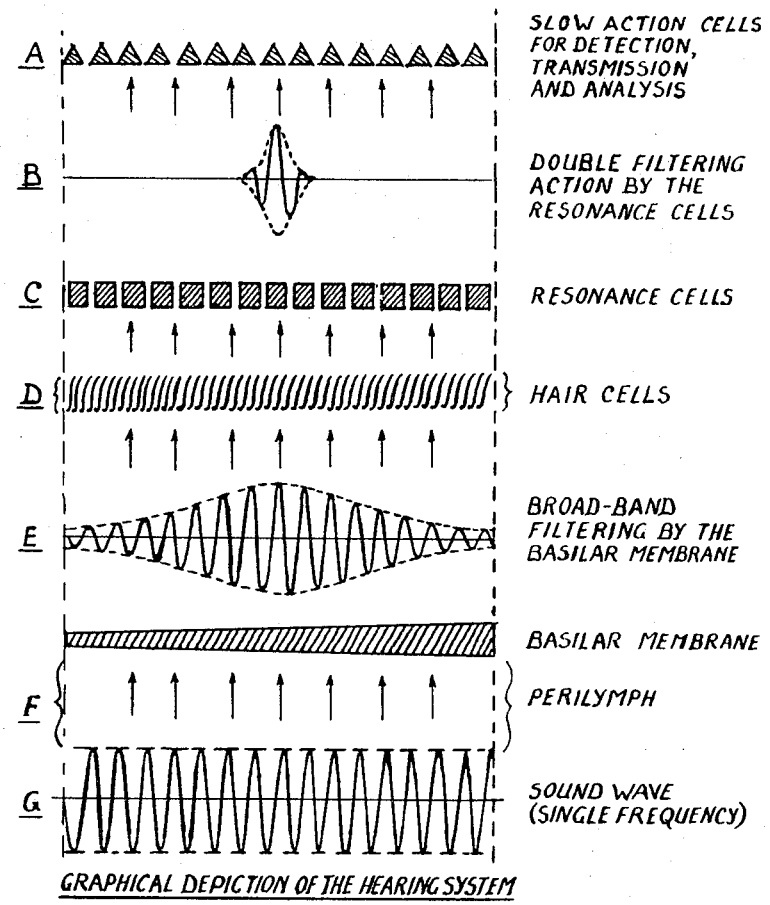
FIG. 1 is a diagrammatical and graphical illustration of how the human brain selects various frequency components from the incoming phonetic sound.

The above given explanation on sound interpretation has been referred to a simple case of single frequency sound wave analysis. The process of recognizing phonetic sounds, however, requires more complex analytical mechanisms for distinguishing between the waves that either represent the quality value, or the phonetic value of the complex sound. Thus before describing how phonetic sounds are recognized, we must first know how the original sound waves are broken into their individual wave components in the sound system of the brain. Referring to the mechanical-to-electrical translation system, the hair cells in the organ of corti had been described in early literature, as being frequency responsive, for selecting and converting various frequency components of the arriving sound wave into individual electrical signals, so that they may be conveyed to the auditory cortex for analytical interpretation. In the modern literature, however, the basilar membrane is the only element that is mentioned for frequency selection. While the basilar membrane is a highly sophisticated and accurate mechanism for frequency selection, it alone is not sufficient to provide the requirements of high selectivity at fast changing speeds of the sound wave that the brain is capable of performing, such as evidenced by the skill of a highly trained musician. Accordingly, we must find other areas in the brain, as being frequency responsive, so as to provide the required multiple filtering action, such as is practiced in the designs of filters in radio sets. This may be described, as in the following:

Referring to the organ of corti, the hair cells convert mechanical stresses into electrical signals, and transmit these signals by way of neurons in the eighth cranial nerve to a first stage of complex switching center, called the "cochlear nucleus," then to the medial geniculate, and finally to the auditory cortex. The electrical signals from each one of the hair cells represents a different frequency of the sound that enters the ear. As explained in the modern text, the hair cells are not frequency responsive, but their physical relations (through a complex of tissues in the organ of corti) with respect to the tapered length of the basilar membrane represent different frequencies, as transmitted to the auditory cortex. The frequency selection is then performed by the basilar membrane, which represents a finite number of resonant points along its tapered and variably tensioned length. That is, the membrane creates its greatest crests of high-frequency vibration where the membrane is tight and narrow, and its greatest crests of low frequency vibrations where it is slack and wide. Thus, the membrane acts as a frequency selector along its entire length, and those hair cells which are distributed at those different points along this length (through a complex of tissues) transmit to the auditory cortex electrical signals representing different frequencies of the incoming sound wave. Assuming that such an assembly is the only frequency selecting mechanism, as accepted in general, we must first realize that the human auditory perception has extremely fine frequency selection at high speed, and that the basilar membrane alone cannot provide such fine information to the auditory cortex. For example, if at a given point on the tapered basilar membrane at F in FIG. 1, had a broad bandwidth response curve, such as shown by the graph at E, too many of the hair cells at D would carry the representative electrical signals to the auditory cortex at approximately the same magnitude, and prevent distinct interpretation of the frequency of the sound. Whereas, the human brain can perform extremely fine analysis and interpretation of a wide band of frequencies and modulations in the music sound waves. Thus, if the basilar membrane is to be considered purely as a mechanical device, and no matter how perfect a biological mechanism it may represent, it is impossible to obtain distinct frequency selection at any point over the length of its continuous surface; unless, the membrane contains some sort of serrations along its length, representative of distinct resonators. Accordingly, the brain must contain either a series of systems for further narrowing the band of frequency selection, such as shown at B in the illustration, or a large number of distinct elements that by themselves can act as narrow passband filters. These elements can be explained, as in the following:

The term "resonance cell" is not a standard terminology in biophysics, but it is used herein to describe a new type of cells that must necessarily exist according to the capability of the brain in selecting waves of different frequencies from the fast changing sound waves. The electrical stimulations of these cells are received from the associated hair cells by way of the filaments from the axon endings. Because of their specific physical characteristics, each one of these cells is capable of responding to an electrical stimulation during a definite time period, after which time it must go into a relaxation period for a new cycle of activity. Thus, if the frequency of the electrical stimulation corresponds to a cell's active and relaxation time periods, then that particular cell behaves as though it were resonant to that particular frequency of electrical stimulation, while the other cells remain inactive, or, partly active, depending on frequency separation between their responses and the stimulation frequency. Stated otherwise, each cell in the entire group of these electroresponsive cells acts as a pass filter to a particular frequency, and therefore, provides the required multiple passband filtering that is commonly practiced in the designs of radio receiving sets.

The existence of the resonance cells can be proven in different ways. For example in our own conscious experience, we feel that the human ear besides sending sound information to the auditory cortex for analysis and congnizance of the sound, it also sends electrical information that the sound is real and is received form an outside source, e.g., from the mechanical vibration of the basilar membrane. Whereas, when the same sound is imagined in exact conformation, there is no cognizance that the sound is real, and there is no feeling that the sound is coming from an outside source, unless probe stimulation by highly trained skill is performed. If, however, the human ear does not send separate signals to the brain, indicating that the sound is coming from an outside source. It is the switching (synapses) action (prior transmittal to the electroresponsive cells) of the cochlear nucleus that sends the sensation signals of the sound coming from the ear. Thus if we term the two types of stimulations as, real sound information, and silent sound information, we can then perform silent sound stimulation artificially, by stimulating the resonance cells from an outside source. Such a practice of silent sound stimulation had been discovered accidentally by a boy named Pat Flanagan, and reference may be made to a report given in Los Angeles Times, Apr. 5, 1962, part 1, p. 28. The experiment was as in the following:

A radiofrequency wave was modulated by sound waves, and applied to two planar electrodes. After insulating these electrodes properly, these electrodes were held space parallel against the temples, which stimulated the brain with the feeling that the sound is being heard, but silently. This strange phenomena was not explained at the time, and it still remains a mystery in scientific knowledge, but it confirms my theory of the resonance cells. To explain this theory, the two electrode pads in the experiment caused a high-frequency electric field that traversed the area of said resonance cells, which in this case, will be referred to the cochlear nucleus, as containing these cells. The changing electric field between the two plane parallel electrodes stimulated these cells electrically, and because this changing field was modulated in amplitude by the sound waves, the different cells responded to the different frequency components of the sound wave; thus rendering the effect of sound hearing. But since the cognizance signals as created by the switching actions of the synapses, were absent, the brain interpreted the arriving signals as silent sound. This condition can easily be explained due to the fact that the resonance cells are frequency responsive and can be stimulated within modulated electric field. Whereas, the synapses represent contact point switches, and can only be stimulated by electrical impression, or by physical pressure (probe) upon them. This is the exact reason why schizophrenics experience hearing of real sound in their trance, because some chemical substance produced spontaneously stimulates these synapses, in conjunction with stimulation of the resonance cells for imaginative behavior.

The reason that the plane parallel pads were effective in stimulating the resonance cells is that, low-power oscillatory electric field traversing the body can easily stimulate the resonance cells electrically, such as in diathermy practice. Whereas, radiating oscillatory waves cannot penetrate the body, except in limited depth, when high-power radiation is used. This is the reason why in various reports it has been stated that people walking close to high-power radar antennae are bothered with "blip," in their heads. As a supplement to such reports, those who experience the blips, will find that when they turn their heads in a direction that the penetration resistance is the least they will experience stronger sounds, with further proof of my above given theory of the existence of the resonance cells, for proper frequency selection from the arriving sound waves.

With the explanation of the existence and behavior of the resonance cells, acting as a plurality of passband filters to the arriving complex sound wave to be interpreted, the remaining essential elements for a complete interpretive system may then be substituted by temporary and permanent memory cells refer to my manuscript entitled "Memory Cell: Its function and atomic arrangement" July 8, 1968, two copies of which are in the Library of Congress, neurons and synapses, which can perform complexity of functions, much more efficiently than by the synthetic elements used in electronics practices. For more detail on the structure and behavior of the synapse, reference may be made to an article by Sir John Eccles in Scientific American Jan. 1965, pp. 56–66.

PHONETIC SOUND RECOGNITION

With the above given explanation on the resonance cells acting as a plurality of passband filters, assume that the electrical signals translated by the hair cells are transmitted through neurons in the eighth cranial nerve to an area where a secondary electrical image is formed by the resonance cells. From this secondary image, signals are conveyed to the permanent memory cells via a maze of intercoupled neurons for relative value matchings. Thus assuming a numerical scale as a stimulation, and assigning numerical positions to the resonance cells, for example, number one to the cell resonating at the lowest frequency, the phonetic sound is represented by the combined numerical ratios between the lowest selected number (in some unknown region of these numerical positions) and predetermined two other selected higher numbers, and the ratios between the quantity values of these selected numbers. Thus, a continuous coincidence is made between the ratios of numerical positions of the lowest number and the higher numbers present, and the quantity ratios between these selected positions. The lowest numerical position in this case, however, does not represent the pitch or the fundamental frequency of the spoken sound, as stated in the foregoing. But without the presence of either the pitch or the fundamental frequency wave the brain could not possibly interpret the phonetic sound, because these waves are the signal waves for informing the brain when to start and when to end analytical interpretation of the phonetic sound. This will manifest itself more clearly, as in the following:

PITCH AND FUNDAMENTAL TIME PERIODS

Figure 2:
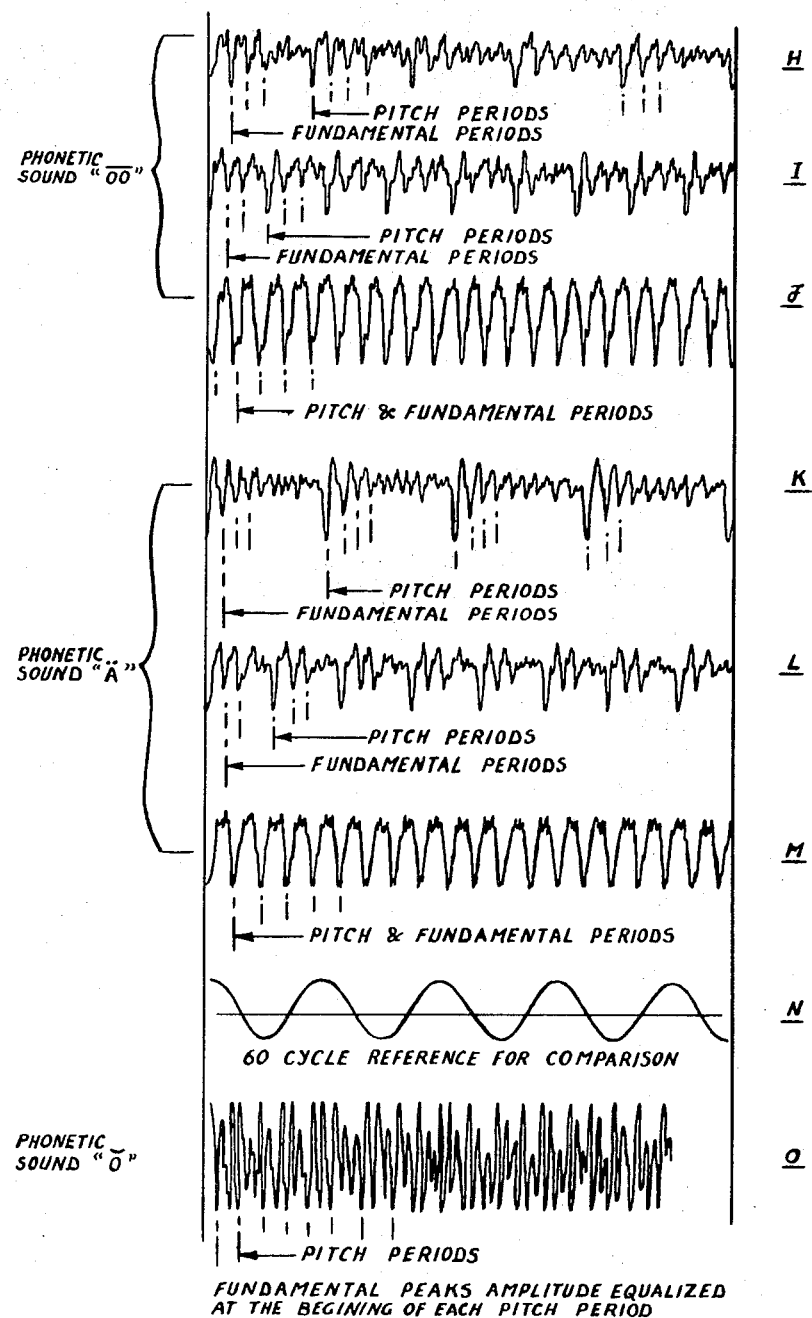
FIG. 2 is a graph of actual phonetic sound waves for pointing out where the phonetic informations are located.

Referring to the actual excitation for space vibration of vocal sounds, the mouth cavities are shaped differently for each phonetic sound, so as to produce a group of vibratory waves having definite frequency and intensity ratios with respect to the lowest frequency wave of the group. These sound vibrations are initiated by puffs of air from the glottis entering the mouth cavities, and the time period between each succeeding puff of air is represented as the glottal pitch period. These phonetic sounds can be produced whether the vocal cords (actually there are no cords physically, but they are folds, as sometimes called) are used or not, such as in whispering. When the vocal cords are used, however, other puffs of air also enter the mouth cavities, and the time period between each of these last said succeeding puffs of air is represented as the vocal cord fundamental period. That is, the puffs of air from the glottis initiate vibratory excitation in the mouth cavities, and also cause vibration of the vocal cords, the latter of which augments extra puffs of air in the mouth cavities, as explained in the foregoing. In hise Pat. No. 2,562,109 . The frequency of the fundamental depends upon the physical tension imposed on the vocal folds. Thus, the purpose of these puffs of air, whether it be at pitch frequency, fundamental frequency, or combined, is to initiate mechanical vibrations in the specific shaped mouth cavities for producing the required resonances of phonetic sounds. By changing the physical tension upon the vocal folds, the vocal cord fundamental frequency may be made equal to or higher than the glottal pitch frequency, but never lower than the pitch frequency. This may be described by way of the actual graphs of phonetic sound waves, as spoken by a single speaker under different conditions:

In FIG. 2, the graphs H, I, and J represent the sound "$\overline{00}$," and the graphs K, L, and M represent the sound "A." In the production of the first graph H, the speaker had formed his mouth to produce the phonetic sound with his natural glottal pitch and vocal cord fundamental frequencies. Without changing the formation of his mouth, the speaker produced the same phonetic sound with a higher glottal pitch and vocal cord fundamental frequencies, as shown by the graph at I. And still holding the same mouth formation, he raised the glottal pitch and vocal cord fundamental frequencies of his voice until the glottal pitch frequency was equal to the vocal cord fundamental frequency, as illustrated by the graph J. This same procedure was repeated in producing the phonetic sound "A," as illustrated in the graphs K, L, and M. For time comparison of these graphs, the sine wave at N is given at 60 cycles per second. In reference to the graphs H, I, and J, it is seen that the vocal cord fundamental time period has not changed much (any little change is due to the speaker's inability of holding the shape of his mouth steady during the process of taking the graphs on "Honeywell Visicorder," in fact, these little changes are also apparent during the recording period of each steady sound) in the production of the sound at different glottal pitch frequencies. For example, the graph at H of base voice, indicates that there are at least four cycles of the fundamental. Whereas in a higher pitched voice at I, there are about 2½ cycles of the fundamental. Lastly, when the glottal pitch repetition rate has reached its limit, both the fundamental and pitch periods assume the same time periods, because the vocal cord fundamental period can never be longer than the glottal pitch period, as illustrated in the graph at J. These three illustrations indicate that the phonetic information is contained in one wavelength period of the fundamental wave (these informations may repeat more than once in each pitch period, as indicated at H and I). The mouth formation is purely to produce a definite set of resonances in various intensities, that have definite frequency locations with respect to the lowest existing frequency above the fundamental, regardless of what sound spectrum band they are located in. This is contrary to previous assumptions that the mouth cavities are formed to resonate at fixed frequencies. In fact, it may appear that a higher pitched voice will have higher fundamental frequencies than a lower pitched voice. But this is not always the case, and it is not even a rule as to what pitched or quality voice should have higher or lower vocal cord fundamental frequencies. For phonetic recognition alone, the brain needs only to know if there is a set of basic resonances with definite ratios of frequency separations with respect to each other, in conjunction with specific amplitude ratios with respect to each other.

BLOCK REPRESENTATION OF LEARNING BY THE BRAIN

Figure 3:
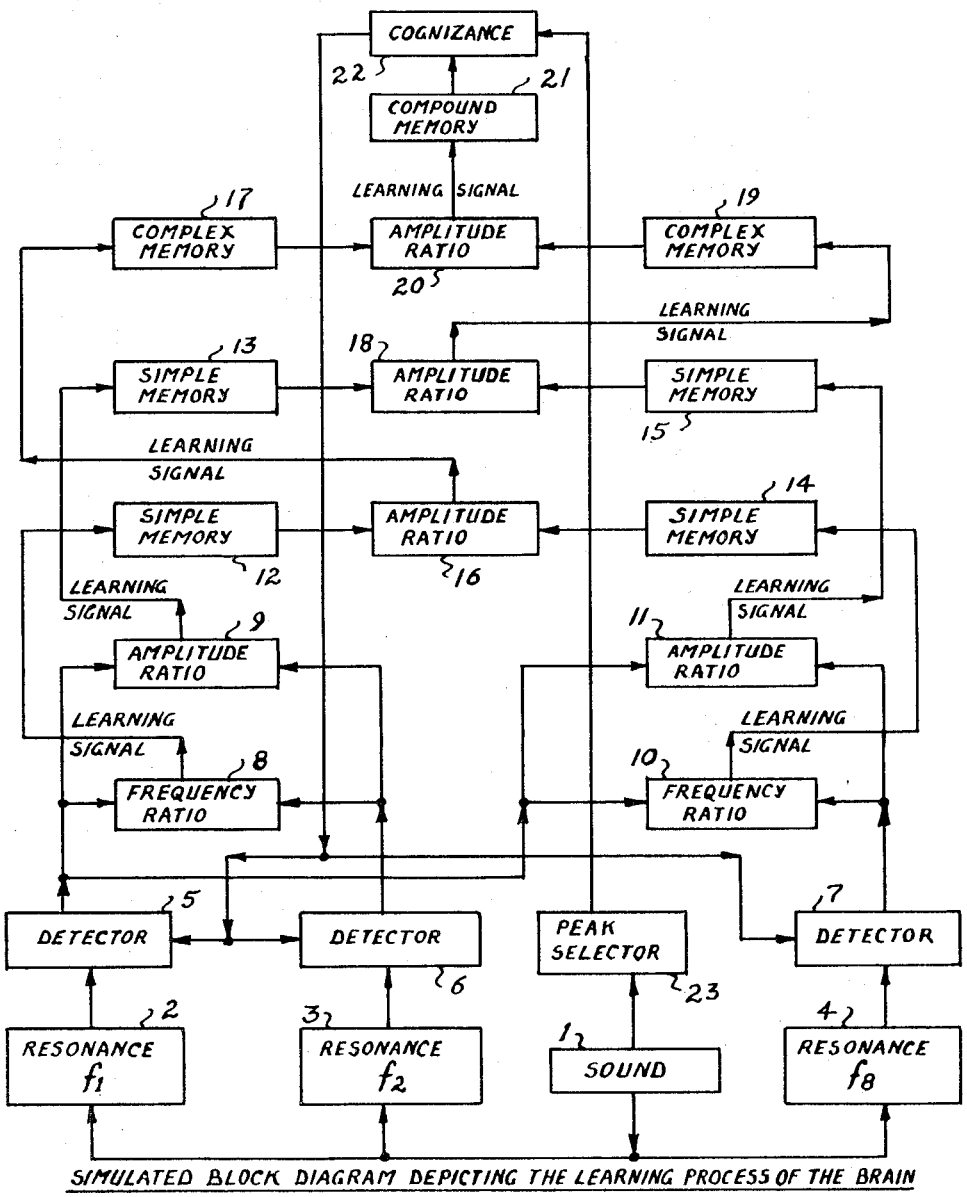
FIG. 3 is a representative block diagram showing how the brain learns phonetic sounds.

In reference to the foregoing, a complex sound wave consists of a number of resonances in various amplitudes and in unpredictable time sequences. The selection and analysis of these waves must then require the use of passband filters; storage systems refer to my description of the memory cells, as mentioned in the foregoing; erasing systems; relays; gates; coincidental comparison systems; and the like. While in the art of electronics these elements are commonly used and their physical properties and behaviors are understood, the brain also possesses these elements with much more perfection of operating conditions. For example, the relays and gates are performed by the synapses; the passband filter actions are performed by the resonance cells, as described in the foregoing; and the coincidental comparisons are performed by the excitatory and inhibitory actions at the nerve fibers, as described in the article on the synapse, mentioned in the foregoing. Thus, it will suffice to describe the analytical functions of the brain by block diagrams. Since interpretation must precede by a learning process, however, the function of learning must first be given, in order to arrive to a logical conclusion, as in the following:

In describing the process of learning, it is first assumed that the brain is mature but completely ignorant of the information to be learned. Thus, we may now convey a phonetic sound comprising three basic resonaces to be learned. These three resonances from the sound block 1 in FIG. 3 are picked up by the resonance blocks 2, 3, and 4, and the outputs of these blocks are detected by the blocks 5 to 7, respectively. The resonance block 2 is tuned to a harmonic frequency $f_1$, representing the lowest of the three frequencies the block 3 is tuned to a harmonic frequency $f_2$, and block 4 is tuned to another harmonic frequency $f_8$. These tuned blocks represent the resonance cells, as described in the foregoing. The detectors in blocks 5 to 7 represent temporary memory cells, or in the language of electronics, they may represent storage capacitors which may be charged to steady state values and then discharged by short-circuiting them at the proper time. Thus assuming that the input sound wave is produced within a single pitch period (from major peak to major peak) which may also be a fundamental time period, the three basic resonances are separately passed through blocks 2 to 4, and stored in proportional peak levels in the blocks 5 to 7, respectively. This storage is important, because the three resonances arrive at different time intervals during the pitch period, and for final decision of learning all these stored signals must be present, e.g., if the detectors 5 to 7 were represented by capacitors both with parallel connected resistors, some of the stored signals would have lesser values at the end of the pitch period. Up to this point there is established temporary memories of basic component parts at the outputs of blocks 5 to 7. These basic values must now be translated into permanent simple memories; complex memories; and finally to a compound memory, which is accomplished as in the following:

Assuming that resonance $f_1$ represents the lowest frequency, the stored signals of blocks 6 and 7 are separately measured with respect to the output signal of block 5, both in frequency and amplitude ratios. For example the outputs of 5 and 6 are measured in block 8 for an indication of frequency ratio (the frequency ratios, in this case, are to be referred to numerical ratios on a numerical scale, since the blocks 8 to 10 represent numerical positions on a numerical scale), and the outputs of 5 and 6 are measured in block 9 for an indication of amplitude ratio. Similarly, the outputs of blocks 5 and 7 are measured in block 10 for an indication of frequency ratio, and the outputs of 5 and 7 are measured in block 11 for an indication of amplitude ratio. These indicated ratio values now represent simple memories, and must be applied to permanent memory cells. Thus according to the block arrangements, the measured output of block 8 is transmitted to the memory cell (representing simple memory) in block 12 for activation, which at this time assumes a permanent knowledge of the original signal conveyed. Similarly, the measured output of block 9 is transmitted to the memory cell (representing simple memory) in block 23 for activation, which at this time assumes a permanent knowledge of the signal conveyed. The simple memory in block 12 has now a permanent memory of frequency ratio, and the simple memory in clock 13 has a permanent memory of amplitude ratio. This very process is similarly repeated in the simple memory block 14 and 15, as shown by the drawing.

Prior to learning, the memory cells are not active, and do not perform any operation. But once they are activated in maturity with knowledge, or memory, they perform preassigned duties whenever reexcited by either from an incoming signal from outside source, or from within (imagination). Thus in reference to the process of cell stimulation already reached at this point, and with continued stimulation from the stored signals from blocks 5 to 7, in FIG. 3, the simple memories in blocks 12 and 14 produce output signals for coincidental measurement in block 16, the output of which is applied to the memory cell in block 17 for activation, as a permanent knowledge of the simultaneous stimulations of the simple memories in blocks 12 and 14. Thus the memory cell in block 17 represents a complex memory of frequency ratios. Similarly, the simple memories in blocks 13 and 15 produce output signals which are coincided in block 18, for activating the complex memory of amplitude ratio. Finally, and in similar fashion, the outputs of 17 and 19 are coincided in block 20, the output of which is transmitted to the compound memory cell in block 21, which now represents the final recognition element of the compound signals arriving from the sound block 1. At this point, however, knowledge of this recognition is not acquired until a command signal arrives at the cognizant cell in block 22, indicating that the knowledge acquired so far represents the final recognition of the sound. This is accomplished by the major peak (pitch) or fundamental detector in block 23, which at the end of the pitch period sends a pulse signal to the cognizance cell in block 22 indicating that the incoming information has ended. At this point, the cognizant cell having already received a signal from the compound memory cell in block 21, the simultaneous pulse from block 23 stimulates a sensation that the incoming information has been heard and learned. After such cognizance, the cell in block 22 sends erase signals to the storage cells in blocks 5 to 7, to start anew for the following incoming information. Here again, in order to understand how the memory cell acquires memory, which can be reduced to below a threshold level, and raised again above that level for an act of memory, repeatedly without any destruction to it, reference should be made to my description of the memory cell. With the process of learnings, the interpretation of already learned information may now be described by way of the block arrangement of FIG. 4.

SIMULATED BLOCK DIAGRAM DEPICTING THE INTERPRETIVE FUNCTION OF THE BRAIN

Figure 4:
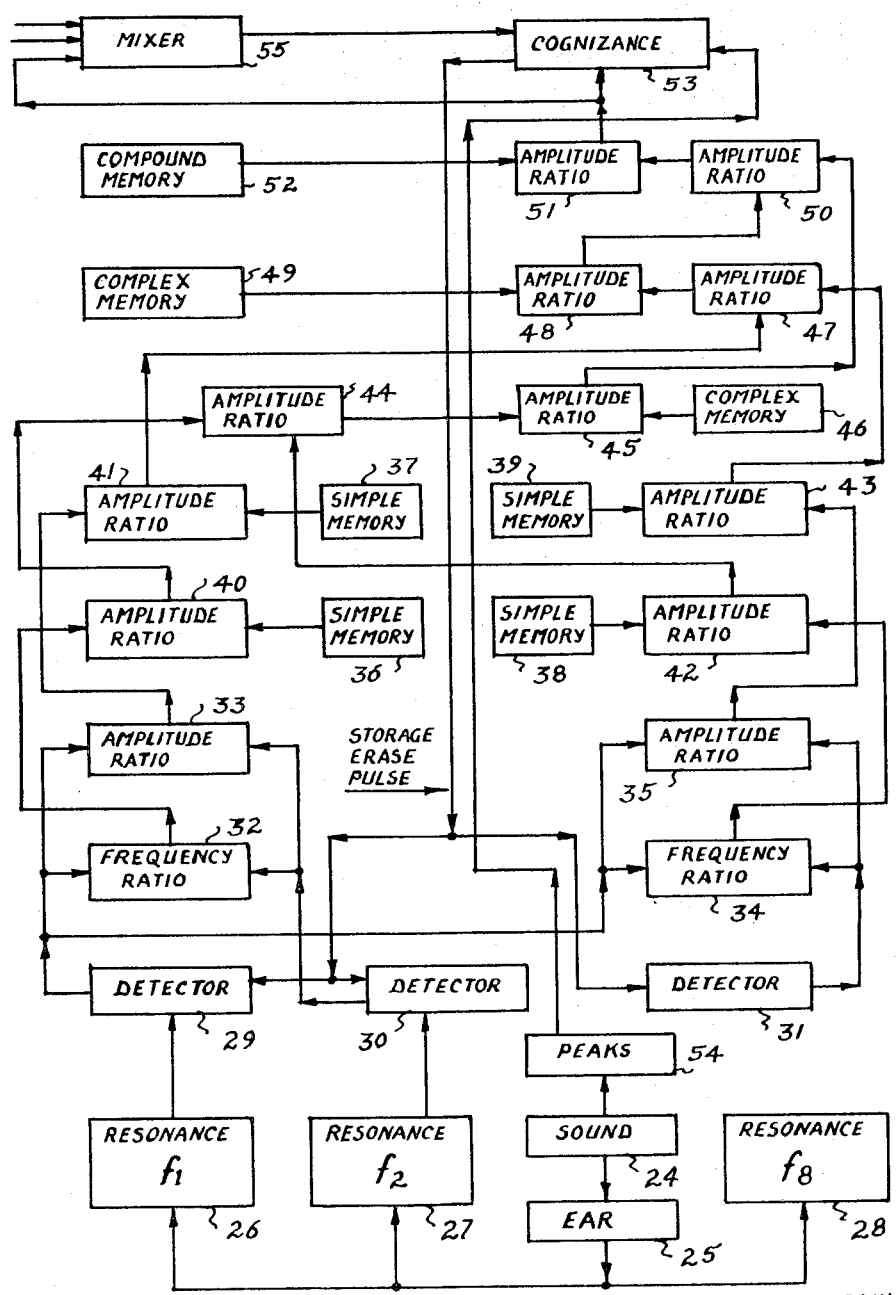
FIG. 4 is a representative block diagram showing how the brain interprets phonetic sounds.

Referring to FIG. 4, the sound in block 24 is transmitted to the ear in block 25, from which the various resonances are translated into electrical waves and conveyed to the resonant cells in blocks 26, 27 and 28. As described in the foregoing, each one of these cells (thousands) responds to an electrical wave of definite frequency; thus the cells in blocks 26, 27, and 28 are represented as having frequency responses at $f_1, f_2$ and $f_8$, respectively. The outputs of blocks 26, 27 and 28 are detected in detector blocks 29, 30 and 31, respectively for temporary storage. As described in the foregoing, the resonance at $f_1$ represents the lowest frequency of the phonetic information, and therefore, the output storage signals of blocks 30 and 31 must be matched with the output storage signal of block 29. Thus the frequency ratio between $f_1$ and $f_2$ is measured in block 32, and the amplitude ratio of these two resonances is measured in the block 33. Similarly, the frequency ratio between $f_1$ and $f_8$ is measured in block 34, and the amplitude ratio of these two resonances is measured in the block 35. The outputs of blocks 32 then represent the simple memories that had been described by way of the block diagram in FIG. 3. Accordingly, the outputs of these blocks are now measured with respect to the outputs of simple memories of blocks 36 through 39, in amplitde measuring blocks 40 through 43, respectively. The sequence of this matching process continues until a single output signal is obtained. Thus, the measured outputs of blocks 40 and 42 are measured in block 44, and the measured output of this block is further measured in block 45 with respect to the signal of complex memory in block 46. Similarly, the measured outputs of blocks 41 and 43 are measured in block 47, and the measured output of this block is further measured in block 48 with respect to the signal of complex memory in block 49. Finally, the measured outputs of blocks 45 and 48 are measured in block 50, and the output of this block is measured with respect to the signal of compound memory in block 52. With all these sequences of matching when a final signal is obtained at the output of block 51, it energizes the cognizance cell in block 53 with the feeling of recognizing the incoming sound. However, this recognition is not completed until a signal arrives from the pitch detector in block 54, which causes the feeling of having received and recognized the sound, and at which instant the block 53 sends erase signals to the detectors 29, 30 and 31, for a new cycle of storage.

With the above given explanation, and in conjunction with the block diagram representation, it is seen that the brain interprets phonetic sounds only by ratio measurements, and not by fixed location finding. For this reason, the brain doesn't care in what frequency region of the sound spectrum band the phonetic sound is uttered, because it already has a huge number of complex intercouplings to take care of all the variables. For example, if a phonetic sound consisted of the basic resonances $f_1, f_2$ and $f_8$, as shown in the block diagrams, these resonances may just as well be $f_2, f_4$ and $f_{16}$, and the phonetic interpretation would still be the same, except of course, the quality of information would change. For this reason, the cognizant cell in block 53 is energized through a mixer, as shown by the block 55, so that the same interpretive signal that may result from a set of resonances produced in different regions of the sound spectrum will be applied to the cognizant cell in block 53 through the mixer block 55.

While the human brain is an immensely complex machine for speech recognition in all qualities of voices, a manmade machine must be practically simple, and it is essential that all variables in speech must first be standardized as will be shown in the following, which in the present invention, will particularly be referred to frequency standardization, by way of channel output position switching.

BLOCK DIAGRAM OF FIG. 5

Figure 5:
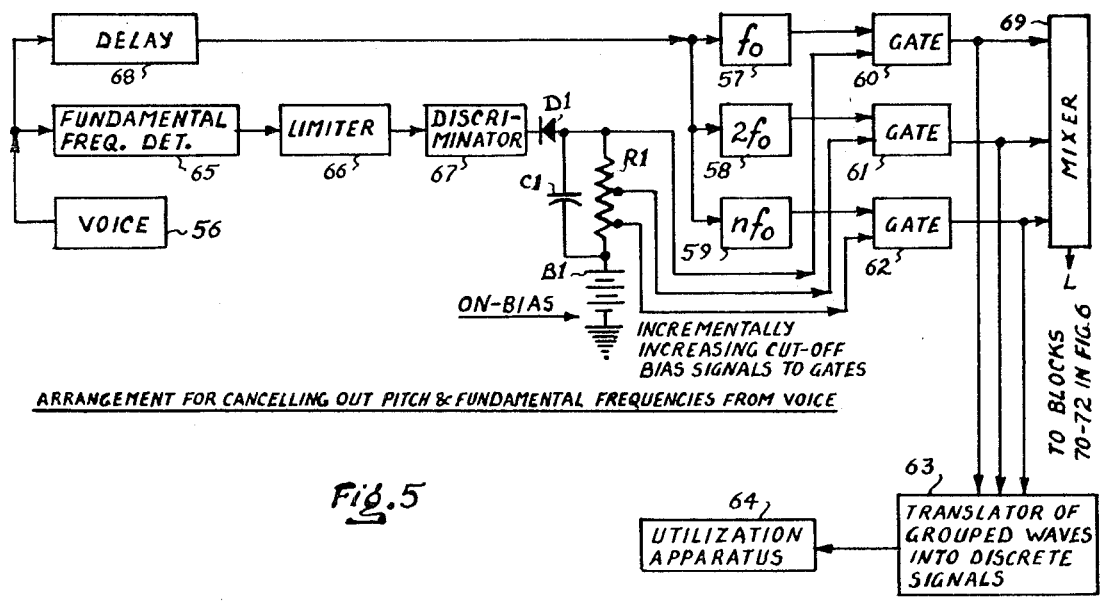
FIG. 5 is a block arrangement showing how the pitch and fundamental frequency components may be removed from the phonetic sound wave, according to the invention.

With the above given theoretical explanation of the analytical function of the brain, reference will now be made to the practical arrangements that may be utilized to perform satisfactory recognition of spoken phonetic sound waves, as in the following:

Referring to the block diagram in FIG. 5, the phonetic sound wave originating in block 56 is applied in parallel to a plurality of band-pass filters, of which only the filters in blocks 57, 58 and 59 are shown. These filters are intended to break the various frequency components of the sound wave, and apply through normally operating gates 60, 61 and 62, respectively, to the analytical apparatus in block 63 for translating the grouped resonances from these various channels into discrete signals, as representations of the arriving phonetic sounds, so that they may be utilized in any desired form in the utilization apparatus of block 64. The voice output of the block 56 is also applied to the fundamental frequency selector in block 65, which produces at its output waves at varying fundamental frequencies. The fundamental frequency detector in block 65 may be similar to my pitch frequency selector, as disclosed in my U.S. Pat. No. 2,957,134 Oct. 18, 1060, entitled, "Fundamental Frequency Selector From Speech Waves." Actually it is a pitch frequency selector, but by varying the RC time constants of the circuitry used, it can also be used as a fundamental frequency selector, because functionally it is a peak selector. For practical use of the circuit given in FIG. 3 (in said patent), however, and with the given values for R10 (1 megohm) and C7 (0.1 mfd.), the circuit operates satisfactorily for selecting pitch frequencies within 80 cycles to 500 cycles per second Since this circuit is mainly a a major peak (pitch) selector, the submajor peaks (representing the fundamental peaks) can also be selected by decreasing the capacitance value of C7, for example, raising the operation frequency to between 300 cycles to 800 cycles per second, which is the average fundamental frequency range in normal speech. To be more specific and in reference to the actual waveforms at H in FIG. 2, it is seen that the highest major peaks represent the pitch periods. When the time constant of the RC network just mentioned is adjusted long enough during each pulsed negative feedback (as described in the reference disclosure) the circuit will be driven into idleness long enough to avoid any reponse to the submajor peaks representing the fundamental periods. My reference circuit is extremely sensitive for differentiating very small differences between the major and submajor peaks, and I have used it satisfactorily in my speech analyzing systems. When the time constant of said network is shortened, however, it will also respond to the submajor peaks representing the fundamental peaks, but not to the minor peaks that represent higher frequencies than the fundamental. Thus the use of my reference patent will be adequately satisfactory for the purpose given herein. These waves of varying frequencies are first limited in amplitude in block 66, and applied to a frequency discriminator in block 67, for changing the frequency variations into voltage amplitude variations across output resistor R1 in series with the rectifier D1. In order to eliminate pulsating voltages across R1, it is bypassed by the capacitor C1. The varying voltage across R1 is tapped into voltage divisions, and applied in inhibiting directions to the gates 60, 61 and 62. Thus assuming that the voltage across R1 increases with increase in frequency of the fundamental output of block 65, the gate 60 is rendered inoperative first with the lowest output voltage across R1, and the gate 61 is rendered inoperative next as the voltage across R1 increases, and so on. By such preadjusted voltage taps across the resistor R1, the outputs of those passband filters that respond to the fundamental or pitch frequencies of the arriving voice signals in block 56 are gated off in the said gates, and thereby leaving only those waves that are located in a frequency region above the unknown fundamental frequency passing to the analytical apparatus in block 63. The output of block 63 may then be applied to any desired form of utilization apparatus, as in block 64.

It may be noted that the time period of a pitch or fundamental wave is not known until at the end of this wave, which causes some delay in shutting off of the gates 60 to 62. As a compromise to such delay, the output of the voice in block 56 is passed through a delay circuit in block 68 before applying to the filters 57 through 59. The delay time period in block 68 may be adjusted to the average delay that may be caused by the fundamental frequency variations. For greater accuracy, however, alternate operations may be employed by long delay arrangements, such as shown in my patent application Ser. Nos. 488,076 filed Sept. 17, 1965 now Pat. No. 3,431,359

Mar. 4, 1969. In some systems it may be required that the pitch-and-fundamental frequency eliminated outputs of the gates 60, 61 and 62 are remixed for further control functions. Accordingly, the block 69 is also shown, in which the outputs of these gates are mixed for further control to remote terminals, for example, as shown by the arrangement given in FIG. 6.

FREQUENCY CONVERSION SYSTEM IN FIG. 6

As described in the foregoing, the frequency components that collectively constitute some intelligible information, whether it be phonetic sound waves, sonar target waves, or otherwise, are recognized by their ratio relations with respect to their constituent wave component that has the lowest frequency. Since this lowest frequency is variable and unknown, it becomes for practical purposes that some sort of standardization be used, such as by the exemplary arrangement shown in FIG. 6.

Figure 6:
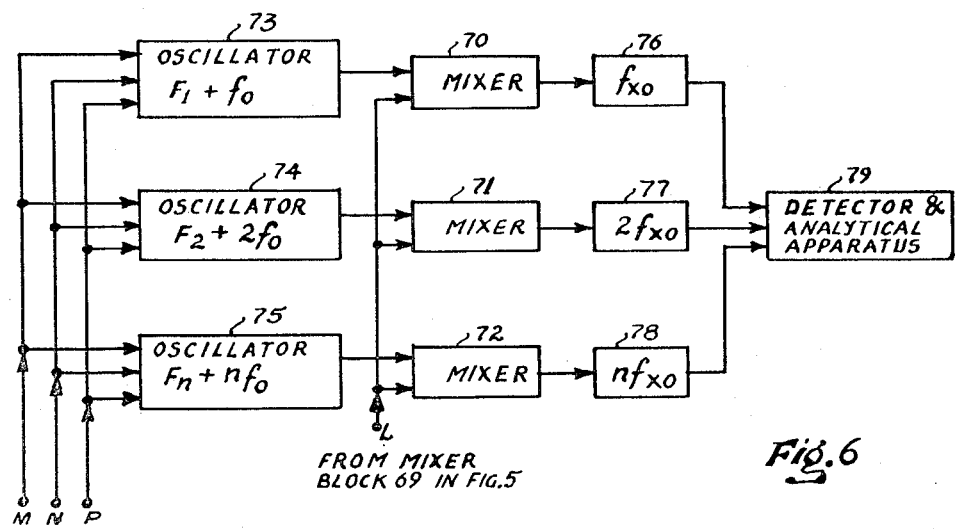
FIG. 6 shows a block arrangement of frequency conversion system useful with the present invention.

In FIG. 6, the sound wave from which the pitch and fundamental frequencies have been eliminated, such as in block 69 in FIG. 5, is applied in parallel to the frequency conversion mixer circuits in blocks 70 through 72, to which are also applied the oscillatory waves of oscillators in blocks 73 through 75, respectively. The frequencies of oscillators 73 through 75 are variably controllable in predetermined harmonic proportions, so that the mixed product of the lowest frequency $f_o$ of the sound wave in any unknown frequency region and the varied frequency of the oscillator in block 73 may be shifted equal to the fixed center frequency $f_{ro}$ of the passband filter 76. The passband filters in blocks 77 and 78 will similarly receive fixed product frequencies $2f_{ro}$ and $nf_{ro}$, respectively, by harmonically proportioned variations of the oscillators in blocks 74 and 75. The frequency converted outputs of the passband filters in blocks 76 through 78 are then applied to the block 79, in which these outputs are analyzed and translated into a utilization signal representing the phonetic sound in question. Since the sound wave applied to the mixers in blocks 70 through 72 has been first modified by elimination of the pitch and fundamental frequency waves that it had originally contained, the control signals applied to the oscillators in blocks 73 through 75 for varying their frequencies are obtained from the frequency component in the modified sound wave having the next higher frequency than the fundamental frequency. The determination of this next higher than the fundamental frequency is accomplished by an arrangement shown in FIG. 9 (to be described further), wherein, a signal appearing at the output of any one of the gates 171, and 178 to 180 at the end of any one of the successive fundamental time periods of the sound wave, represents the next higher frequency than the fundamental frequency of the sound wave. Thus the output signals of the blocks 171 and 178 through 180 are applied to the oscillators 73 to 75 in FIG. 6 for converting their frequencies according to predetermined proportions. Frequency variation by applied voltages in predetermined proportions has been practiced conventionally, and therefore, further details are not necessary to be included herein, as the block diagram in FIG. 6 is only exemplary to show various ways of accomplishing frequency conversion in complex sound waves.

ARRANGEMENT FOR SIGNAL REGROUPING TO THE CHANNEL INPUTS OF FIG. 7

In controlling the frequency variations in speech sound waves, it is possible to regroup any group of signals derived from subbands of the sound by a specific combination of signal switching, so that a signal of a standard frequency may be represented as the lowest frequency in a group, and the other signals in the group represented by further signals whose frequencies differ from the standard frequency by the same factor of multiplication as the other frequencies in the original group differ from the frequency of the signal having the lowest frequency of the group. This may be accomplished by a numerically arranged switchable channels, to which any group of signals derived from subbands of the sound are regrouped at the inputs of the channels by a specific combination of signal switching, as determined by the signal derived from the lowest frequency in the group. One exemplary circuit arrangement for such switching is shown in FIG. 7, wherein the inputs in blocks 101 to 103, and 107 to 109, as derived from the subbands in blocks 95 to 100, respectively, are coupled to the channels in blocks 85 to 93 through switching blocks 104 to 106 and 110 to 112, respectively, in different combinations, each combination being determined by the lowest frequency in the group of signals in block 113. For example, assume that a group of some information bearing resonances consist of the frequencies $f_1$, $f_2$ and $f_8$. Since the intelligible information is represented by the ratios between these three frequencies, it does not make any difference whether these frequencies occur at $f_1$, $f_2$, $f_8$, or at $f_2$, $f_4$, $f_{16}$. Thus, when these resonances are coming from the filters in blocks 95, 96 and 97, we connect the outputs of these filters to the channel-1, channel-2, and channel-8. On the other hand, when these resonances are coming from the filters 98, 99 and 100, we also connect the outputs of these filters to the same channels to supply the final analytical apparatus in block 94 the same type of information, regardless of which filters the resonances are coming from; thus standardizing the resonance analysis in block 94.

ARRANGEMENT FOR DETERMINING THE FUNDAMENTAL FREQUENCY LOCATION IN THE SOUND SPECTRUM, AS IN FIG. 8

As indicated in the foregoing, there is no set frequency position in the sound spectrum for any one of the component waves in a spoken sound that can be selected from. There are pitch frequency analyzers available, which can determine the time period between any two peaks that represents a pitch period. As I have indicated in my previous patents and patent applications, the fundamental time periods can also be determined by these pitch selectors, simply by readjusting the time constants of the resistance-capacitance networks in these pitch selectors as I have described briefly in the foregoing, in reference disclosure in one of my patents. The problem is then to determine the frequency location of the next higher existing frequency than the fundamental, by which the signal regrouping, as described by way of FIG. 7, can be accomplished. In one mode of determining the next higher frequency, we may first determine the fundamental frequency, and render inoperative all associated switching devices that are coupled both to the fundamental and the lower frequency passband filters. Then, by arranging a switching system that will render all switching devices associated with the filter passing higher than the lowest existing frequency inoperative, the output of the switching device associated with the filter passing the last said frequency may be represented as the lowest frequency of the group of resonances that represents intelligible information. Such an arrangement is shown in FIG. 8.

In FIG. 8, the original voice sound wave in block 115 is applied to a fundamental frequency selector (peak selector) in block 116, which produces at its output pulse signals at the fundamental peaks. These pulse signals are further applied to an alternate switch in block 117, which may be in for form of a flip-flop arrangement, so that alternate square waves at varying time periods are obtained. These alternate square waves are differentiated by the small coupling capacitors C3 through C10, which are further coupled to the inputs of set-reset flip-flops in the blocks 118, 119, 120 and 121. The time periods of the fundamental waves are determined by the charging capacitors C11 and C12, which charge and discharge alternately, as controlled by the alternate switch in block 117, for obtaining contiguity of operation. For example, assume that during one peak of the sound wave the flip-flop 117 operates the flip-flops 118 through 121 in such directions that the blocks 118 and 121 apply forward biases upon the base elements of transistors Q1 and Q2, in series with current limiting resistors R3 and R4, respectively, for rendering these transistors conductive, and the blocks 119 and 120 apply backward biases upon the transistors Q3 and Q4, in series with the current limiting resistors R5 and R6, respectively, for rendering these transistors nonconductive. Thus, Q3 becomes high impedance across capacitor C11, and Q1 becomes conductive for charging the capacitor C11 in series with the fixed timing resistor R7. At the same time, Q4 becomes nonconductive, and Q2 becomes conductive for discharging any voltage that may have been stored in C12 during a previous charging operation. Accordingly, while C11 is charging in series with R7 during one fundamental time period, the capacitor C12 is discharged, while during a succeeding fundamental time period the capacitor C11 is discharged by Q3, and C12 is charged in series with the timing resistor R8. The charging voltages across C11 and C12 are then divided into incremental steps for distribution.

Since the wavelengths of different resonances are representations of time, we may assign a fixed voltage across C11 and C12, and adjust permanently the value of resistors R7 and R8, so that the capacitors C11 and C12 will assume this fixed voltage during a time period representing one wavelength period of the lowest occurring frequency, for example, the pitch frequency. This fixed voltage may then be divided to represent a series of different resonances. For example, if the voice sound is passed through 26 different band-pass filters, then the said fixed voltage may be divided into 26 divisions, each representing a different frequency in the various subbands of the sound spectrum. There are various conventional arrangements from which such voltage divisions may be obtained, but the arrangement shown is considered as novel.

The rising voltage across C11 is coupled to various voltage taps across the supply voltage B2, in series with the diodes D3 through D6, and resistors R9 through R12, respectively. To these same voltage taps are coupled the rising voltage across capacitor C12, in series with the diodes D7 through D10, and the resistors R13 through R16, respectively. Thus, when the voltage across C11 is zero, there appears no current in any of the resistors R9 through R12, because the diodes D3 through D6 are reverse poled with respect to the battery B2. As the voltage across C11 rises, however, currents start flowing through the resistors R9 through R12 step by step, staring from the resistor R12. Similarly, as the voltage across C12 starts rising, currents start flowing through the resistors R13 through R16 step by step, starting through resistor R16. The sequentially rising voltages across resistors R9 through R12, and R13 through R16 are then amplified by the amplifiers in blocks 122 through 125, and in blocks 126 through 129, respectively, in series with the coupling capacitors C13 through C16, and capacitors C17 through C20, respectively. In order to avoid transmittal of continuously rising voltages from the continuous flow of currents through the resistors R9 through R12, and through R13 through R16, during the rising voltages across C11 and C12, the clamping diodes D11 through D14, and diodes D15 through D18, respectively, are included, so that these stepped voltages are transmitted to the inputs of said amplifiers in the form of pulses for amplification. Since the amplifiers in blocks 122 through 125, and in blocks 126 through 129 are fed by these signals in alternate time periods of the fundamental peaks, the output pulse signals of these alternately operated amplifiers are combined into the inputs of gates in blocks 130 through 133, for example, the outputs of amplifiers 125 and 129 are applied to the inputs of gate 130; the outputs of amplifiers 124 and 128 are applied to the inputs of gate 131; the outputs of amplifiers 123 and 127 are applied to the inputs of gate 132; and the outputs of amplifiers 122 and 126 are applied to the inputs of gate 133. Thus, the voltage-divided pulse signals produced in alternate time periods are mixed into continuous outputs from the gates 130 through 133; these output pulses to be further utilized in the arrangement of FIG. 9. Before describing the arrangement of FIG. 9, however, reference is made to the charging capacitors C11 and C12, which will experience some discharges in series with the resistors R9 through R12, and R13 through R16, respectively. But this discharge is not objectionable, and it can be made negligible, by choosing low impedance capacitance values for C11 and C12, and high impedance values for both the capacitors C13 through C20, and resistors R9 through R16, because the amplifiers 122 through 129 can be made to have high impedance inputs, such as by using field effect transistors. Of course, as indicated in the foregoing, other arrangements may also be used with satisfactory results.

CHANNEL OUTPUT POSITION SHIFTING

Arrangements for determining the next higher frequency than the fundamental in the subbands as in FIG. 9

In reference to the output pulses of gates 130 through 133, it was described that the output of each one of these gates represents one of the resonances, as passed through a pass-band filter in the total number of filters used for resonance analysis. Thus the output pulses of these gates from the terminals W, X, Y and Z are applied to set-reset flip-flop circuits in blocks 134 through 137, in FIG. 9, respectively, for operation, which produce at their outputs steady state signals representing different resonances of the incoming sound wave. These steady state output signals are applied to one of the input terminals of the three-input gates in blocks 138 through 141, respectively, which operate only when the three inputs are excited simultaneously. The sound wave in block 142 is applied to the various passband filters in blocks 143 through 146, the outputs of which are first limited in amplitude in blocks 147 through 150, respectively, and finally applied to the second inputs of the gates 138 through 141, respectively, Thus at the end of a single wavelength time period of the fundamental frequency when a pulse signal from the peak selector in block 155 is applied in parallel to the third inputs of gates 138 through 141, those gates that have already received simultaneous signals from the flip-flops in blocks 134 through 137, and the detectors in blocks 151 through 154, respectively, become operative and apply output pulses to their associated set-reset flip-flop circuits in blocks 156 through 159, respectively, for operation the output of each one of the flip-flops in blocks 156 to 159 representing a resonance of the sound wave, for example, starting from the lowest pitch frequency $f_1$ in block 156 to the $n$th frequency in block 159. The output pulse from the peak selector in block 155 is a long duration, and therefore, this long pulse is narrowed down by the small coupling capacitor C21, so that the outputs of gates 138 to 141 are isolated after the flip-flops 156 through 159 are all operated at the arrival of a peak pulse from the block 155, the block 156 representing the lowest frequency $f_1$ applies a voltage at "0" level to the multiple inputs of gates 160 through 162, which represent gates for higher frequencies than $f_1$. Similarly, the block 157 ($f_2$) representing the next higher frequency than $f_1$, applies a voltage at "0" level to the inputs of gates 161 and 162, which represent gates for higher frequencies than $f_2$. Still further, the block 158 ($f_3$) representing the next higher frequency than $f_2$, applies a voltage at "0" level to the input of gate 162 which represents a gate for higher frequency than $f_3$. Since these "0" level voltages are applied to the gates associated with the next higher representative resonances, the output of block 156 does not need an associated gate of its own, because it is the lowest frequency arranged to be selected from the voice sound wave. Also, the block 159 representing the $n$th frequency does not need an associated gate, since it already is the last higher frequency of the resonance arrangement. In actual practice, several of the flip-flops representing low frequencies and the highest frequencies will not need associated gates, because the fundamental frequency has a limited bandwidth, and its design depends upon the particular arrangement that may be adopted for a particular purpose.

While gate circuits may be arranged in different ways, the gates indicated in blocks 160 to 162, and also other circuit arrangements, may be referred to commercially available integrated circuits, because they are cheaper and smaller in size for practical purposes. Thus for simplicity of description, reference will only be made to gate circuits, wherein, any one or all of the inputs receiving "0" level voltage will cause "1" level voltage at the output of the gate. Whereas, when only all of the inputs of a gate are simultaneously at "1" level, the gate output will be at "0" voltage level.

The "1" level outputs of the gates in blocks 160 to 162 are pole altered in blocks 163 to 165, respectively, and further applied to one of the three-input terminals of gates 156 to 168, respectively. At this point, the outputs of gates 166 to 168 do not change, because one of the inputs of these gates are normally at "0" level, as received in parallel from the peak selector in block 155, after passing through the delay circuit in block 169. While the set-reset flip-flops in blocks 156 to 158 apply "0" level voltages to the inputs of gates 160 to 162, they also apply "1" level voltages to the inputs of their associated gates, for example, the RS block 156 block 156 applies a "1" level voltage to the input of its associated gate 170; and the RS blocks 157 to 159 apply "1" level voltages to their associated gates 166 to 168, respectively. Thus when a pulse voltage at "1" level is applied in parallel to one of the inputs of gates 168, and 170, only those gates that have received simultaneous "1" level voltages at their multiple inputs become active and produce "0" level voltages at their outputs. For example, as has been exemplified, the lowest frequency in arriving voice wave was referred to be in block 156. Since the associated gate 170 of this flip-flop does not have "0" level voltage at its input, it changes its state of operation and applies "0" level pulse voltage through the delay circuit in block 171 to the input of the set-reset flip-flop 156 to change its state of operation in steady state. The state of operating reversal in block 156 causes "1" level voltages to the inputs of the gates 160 to 162, but the set-reset flip-flop in block 157 still applies "0" level voltages to the inputs of gates 161 and 162. Accordingly, only the output of gate 166 remains at "1" level impressing upon one of the inputs of gate 172. At this time, the "1" level pulse from the peak selector in block 155 is narrowed down by the small coupling capacitor C23, and delayed through the delay circuit in block 1173 sufficiently long enough to coincide with the "1" level voltage from the output of gate 166, when the outputs of gates 167, 168 and 170 are at "0" voltage levels. Thus, only the output of gate in block 172 changes from normal "1" level to "0" level. The output of gate 172 is then connected to a set of capacitors, through the phase inverter in block 181, which are coupled to a prearranged combination of gate electrodes of the analog switching transistors in FIG. 10, for admittance of the detected outputs of the passband filters in the required regrouping combinations at their outputs.

The gates 173 and 175 are operated in similar fashion, for example: the gate 175 is operated with an "0" level output when the lowest selected frequency is $f_1$; the gate 173 is operated when the lowest selected frequency is $f_3$; and the gate 174 is operated when the lowest selected frequency is $f_n$. When a pulse signal at "0" level is produced at the output of any one of the gates 172 to 175, the output pulse of gate 155 is narrowed down by the small coupling capacitor C21, and delayed through the delay circuit in block 176 in a longer delay time period than by the delay circuit in block 1173, and finally phase inverted in block 177 and applied to the set-reset flip-flops 134 through 137, and 156 through 159, for setting them to normal operating positions, so that a new cycle of analytical operation can start. The delay circuits at the outputs of gates 166 to 168 are shown by the blocks 178 through 180, respectively.

NUMERICALLY ARRANGED CHANNELS, AS IN FIG. 10

As described above, only one of the final controlling gates 172 and 175 operates when a pulse signal arrives from the peak selector in block 155 in FIG. 9, and the operation of any one of these gates regroups the output signals of a group of passband filters to inputs of the channels in FIG. 10. This may be accomplished in a number of ways, for example, by connecting a number of independent coupling capacitors at the outputs of these gates (after being phase inverted in blocks 181 to 184, respectively), and terminated at prearranged groups of switching electrodes of the channels. For example, assuming that at the arrival of a pulse output from the pulse selector in block 155 the output detected signals from the filters $f_1, f_2$ and $f_4$ (in FIG. 10) are to be coupled to the inputs of channels 1, 2 and 4, respectively, for admittance, the coupling capacitors C24, C25 and C26, which are connected at the output of phase inverter in block 184, provide independent switching pulses for the required signal regrouping action. Similarly, when at the arrival of a peak pulse the detected output signals from filters $f_2, f_4$ and $f_8$ (filter $f_8$ is not shown for simplicity of drawing) are to be coupled to the inputs of channels 1, 2 and 4, respectively, for admittance, the coupling capacitors C27, C28 and C29, which are connected at the output of phase inverter in block 181, provide independent switching pulses for the required signal regrouping action. These signal regrouping actions are accomplished by the arrangement in FIG. 10, as in the following:

The detected output signal (in blocks 185 to 187) of each one of the passband filters $f_1, f_2$ and $f_4$ (and to the $n$th band, not shown) in blocks 188 to 190, respectively, is connected in parallel to all of the inputs of the channels used, through normally idle switching gate electrodes, so that the output of any one of the said filters may be connected to any one of the inputs of said channels as required. For example, the channels 1, 2, 3 and 4 (and to the $n$th channel) are represented by the transistors Q5 through Q8, respectively. These transistors are chosen of the field effect type for high input impedance, but its choice is immaterial, and other types may be used just as well. In order to obtain positive and negative output signals from these transistors, for final match mixing, these transistors are operated in source-follower modes, and their source and drain circuit resistors are shown by the pairs of resistors R17, R18 through R23, R24, respectively. The input of each one of these channels, for example, channel 1 as represented by Q5, is connected to all of the detected signals from the passband filters by the mixer diodes D19 to D21, so that any one or the outputs or the said filters may be connected to the input of Q5. Similarly, the detected outputs of these filters are mixed by the diodes D22 to D24, and connected to the input of Q6, representing the 2 channel. These mixed connections are consistent throughout the channels, such as shown by the mixed connections of the filter outputs to the input of Q7 by the diodes D25 to D27, and the same mixed connections to the input of Q8 by the diodes D28 to D30. Thus it is seen that any one of the output signals of the passband filters may be connected to the input of any one of the said channels, as desired. These connections are then electrically established by activating the proper gate electrodes, as controlled by the output pulses of the phase inverters in blocks 181 to 184 in FIG. 9. The operation of the channel switching arrangement in FIG. 10 is, as follows:

Analog switching circuits may be devised in different ways, and since integrated circuits are now in wide use because of their practicability in small size and cost, reference is made to one of the available circuits. Since both the operation and circuitry of all of these switches are the same, however, reference analoy be made to only one of these switches, for example, the switch comprising transistors Q9, Q10 and Q11. This switch is called series-shunt chopper, and utilizes MOS FET transistors. The transistors Q10 and Q11 are connected in series with the detected output voltage of the block 185 and ground, and the switching output voltage is taken from the junction point of the series connected transistors Q10 and Q11. In a chopper arrangement, when Q10 is made conductive for admitting the input signal voltage to the load circuit resistor RL, in series with the mixer diode D19, the Q11 is made nonconductive. Whereas, when the input signal is to be isolated from the load circuit resistor RL, the Q10 is made nonconductive and the Q11 is made conductive, as a shunt circuit, so as to prevent any leakage passing to the load resistor RL. Since the signal voltage from block 185 is normally to be isolated from the inputs of all channels, the Q11 is therefore rendered normally conductive, and the Q10 normally nonconductive. These alternately on-and-off operating states are achieved by the control transistor Q9, which is normally rendered conductive by a negative forward bias (from terminals $x$) upon its gate electrode. The gate electrode of Q11 is connected in parallel with the gate electrode of Q9, and therefore, Q11 is also made conductive for normally shunting the input of Q5. The drain electrode of Q9 is connected in parallel with the gate electrode of Q10, so that the normal current flow through resistor R25 drops the voltage upon the gate electrode of Q10 close to ground level, and since a MOS FET transistor does not conduct before its gate electrode is biased at several volts in forward direction, the Q10 remains normally in nonconductive state. When a positive pulse is applied to the gate electrode of Q9, from the phase inverter block 180 in FIG. 9, however, the transistors Q9 and Q11 become nonconductive, and Q10 becomes conductive, so that the signal voltage at the drain terminal of the transistor Q10 is transmitted to the gate electrode of Q5 in series with the mixer diode D19. Thus, any group of the output detected signals from the filters in blocks 188 to 190 (and the $n$th filter) may be regrouped and passed through different channels in any combination that may be desired positions, by the associated gate circuits. Similarly, more than one of the detected outputs of adjacently positioned filters may be simultaneously switched to the input of any channel, so as to broaden the selection of different frequencies in the sound wave; thus narrowing some of the frequencies in the sound wave; thus narrowing some of the frequency variations that undesirably occur in the original sound waves for translation purposes. This may be shown by the signal regrouping combinations in the chart of of FIG. 12, as follows:

Assuming that the sound spectrum to be analyzed embraces a frequency range from 120 cycles to 8.5 kc., and divided into 28 bands, we may assign the center frequencies of these bands numerical designations, such as shown in FIG. 11. Each one of these numerical designations then represents the detected output of a particular passband filter, as indicated. Thus for simpler illustration, the signal regrouping combinations may be shown numerically in the chart of FIG. 12. 12

In the upper portion of the chart in FIG. 12 are shown 28 channels, the inputs to which different signals are to be applied through analog switches. In the extreme left-handed side of the chart (in the area of the detected outputs of the filters) are shown the numbers from 1 to 12, which represent the detected outputs of the first through the twelfth filters. This means that any one of the detected output of these twelve filters. This means that any one of the detected output of these twelve filters may at any time be switched in the first channel. For example, referring to the first filter at center frequency of 120 cycles per second, the number 1 is inserted in the first channel. The number 4 representing the second harmonic of this first frequency is inserted in the second channel, and so on. It will be noted that the second harmonic of the first frequency does not exactly coincide with the center resonance of the fourth filter. But the passbands of these filters are broad enough to compensate for these variations. Then again, it will be noted that in the fifth channel the outputs of filters 9 and 10 are inserted simultaneously, since the required harmonic frequency will pass through both the ninth and tenth filters. This is permissible because in the higher harmonics the information carrying frequencies are free from closely positioned stray signals. This is particularly obvious in the higher frequency channels, such as the twentieth through twenty-fourth channels to which the output of the twentieth filter is applied simultaneously. This is permissible because the information carrying higher harmonics are not closely adjacent to each other, and besides, it would not be desirable to use too many filters for practical purposes.

By referring to the chart in FIG. 12, we may then indicate the number of analog switches that would be required with the arrangement of FIG. 10; each switch comprising, for example, the transistors Q9, Q10 and Q11. This is shown by the chart in FIG. 13, wherein, the number of channels is shown in the upper part of the drawing. In the extreme left-handed side is shown the number of filters, and in horizontal lines of these filters are shown the number of switches required with each filter, properly indicated below the channels. For example, the first filter will require only one switch, as shown in the square below the first channel. The second filter will require two switches, shown below the first and second channels. The third filter will require two switches, shown below the first and third channels, and so on, as shown in the squares representing switches. Thus it is not necessary to include as many switches at the output of each filter as there are channels, such as shown in the arrangement of FIG. 9, which is only exemplary, due to only few parts that the drawing can be illustrated with. Of course, these illustrations are all exemplary, and may be arranged differently.

SIGNAL DECODING ARRANGEMENT IN FIG. 14

When a group of output signals from the passband filters are regrouped and pass through channels, these signals are further translated into a discrete signal representative of the information to be analyzed. While different arrangements may be devised for the translation into such discrete signals, reference may be made to the circuit arrangements as disclosed in my previous patents, for example, in my patent issue U. S. No. 3,067,288 Dec. 4, 1962. Another arrangement however, is shown herein in FIG. 14.

in FIG. 14, assume that two output signals of the passband filters are to be passed through the first and eighth channels, as represented by the transistors Q18 and Q19. The output of these channels are then combined in opposing polarities in preadjusted amplitude ratios, so as to obtain a zero (or a threshold minimum) output signal when the said combination matches one of a phonetic sound, or any other type of information to be analyzed. This resultant zero output is then translated into some form of function representative of that particular information.

In order to avoid critical operating conditions, as encountered by environmental changes in component parts, the transistors Q18 and Q19 are operated as source followers, so that equal positive and negative outputs may easily be obtained under different operating conditions. Since the zero output of the combined signals should result from ratio measurement, rather than by discrete signal amplitude the source circuit resistor R26 of Q18 is pretaped for a predetermined ratio of voltage change with respect to the voltage change across the drain circuit resistor (equal value) R27 of Q19, when the inputs of these two transistors are impressed by voltage signals of equal amplitudes. Thus, if the differences both in phase and amplitudes of the simultaneously applied negative voltage pulses to the inputs of Q18 and Q19 happen to have this ratio, the negative and positive voltage changes across resistors R26 and R27, respectively, will be cancelled out across the load circuit resistor R28, as applied by the coupling capacitors C30 and C31. Whereas, when this ratio between the two input signals is different than specified, an output signal voltage will appear across the load resistor R28 in either positive or negative polarity, depending upon the phase between the two signals. The zero output signal represents the information sought, any any other signal above zero, or a threshold level, represents a false information. Thus the zero signal may be translated into a functional signal, as in the following:

The voltage change across R28 is first transferred to the resistor R29 through the threshold gating diodes D31 and D32, which conduct only when the applied voltage is above a certain level. This threshold level may be adjusted to any level, however, by connecting zener diodes in series with D31 and D32; but such an arrangement is conventional, and therefore, is not shown in the drawing. The voltage across R29 is applied to the gate electrode of the phase-inverting transistor Q20, which provides both positive and negative output signals across source and drain circuit resistors R30 and R31, regardless of the input phase. These oppositely poled output signals are coupled to the base electrodes of transistors Q31 and Q22, through the coupling capacitors C32, C33, across load resistors R32 and R33, respectively. The collector electrodes of transistors Q21 and Q22 are connected in parallel, with a common collector circuit resistor R34. Thus, regardless of the polarity of the input pulse signal at the gate electrode of Q20, one of the transistors Q21 and Q22 will conduct and pull the collector voltage close to ground level. The collector terminals of Q21 and Q22 are connected to the base electrode of series-connected gate transistor Q23 in series with the current limiting resistor R35, so that the Q23 is normally rendered conductive. The other series-connected gate transistor Q24 however, is normally biased to cut off (the bias supply is not shown), so that normal current does not flow through the collector circuit resistor R35 of the said gate. The base electrode of transistor Q24, however, is impressed by a negative pulse signal at terminal (U) from the distributor block 193 in FIG. 15 (to be described further) simultaneously with the arrival of a negative pulse signal at the base electrode of either Q21 or Q22, so that when the voltage across R34 is pulled close to ground level, the series-connector gate transistor Q23 becomes inoperative, and therefore, the conductive state of the series-connected transistor Q24 cannot draw current through the collector circuit resistor R35 to produce an output signal. Whereas, when during conduction of transistor Q24 the base electrodes of transistors Q21 and Q22 remain at zero voltage level, the transistor Q23 remains conductive and the voltage developed across resistor R35 is transmitted to an outgoing terminal for any functional purpose that may be desired. Thus it is seen that, only those pulse signals having specific amplitude ratios at the inputs of transistors Q18 and Q19 will cause an output signal across the resistor R35 to be utilized. When some variations occur in the selection of these informations, more than one of the arrangement shown in FIG. 14 may be used with varied adjustments across resistors R26 and R27, so that the resultant output of any one of these arrangements may be mixed arrangements. For drawing simplicity, however, the mixing is indicated by the terminal (V), as arriving from a similar decoding arrangement of FIG. 14.

Referring again to the arrangement of FIG. 14, only two signals have been mentioned as arriving at the inputs of Q18 and Q19 for balancing. In the case that a third signal must also be included for said balancing, as a group, and assuming that the third signal is to be measured with the signal arriving at the first channel, the third signal is compared with the signal arriving at the first channel in a separate arrangement, such as shown in FIG. 14, and mixed at the collector terminals of Q21 and Q22. This is shown, for simplicity of drawing, only by the transistors Q25 and Q26, the collector electrodes of which are connected in parallel with the collector electrodes of Q21 and Q22, which serve for the same purpose of functional operation. As mentioned in the foregoing, the transistors Q21 and Q22, and also the Q25 and Q26, must be normally nonconductive. The base electrodes of these transistors are shown at ground potential, since silicon transistors usually have very low emitter to collector leakage when their base electrodes are at emitter potential. However, there are available transistors with a variety of different operating conditions, and the choice rests on the designer of these circuits. Similarly, an amplifier may be used at the input of transistor Q20, to make sure that the transistors Q22 and Q21 are driven highly conductive for properly cutting off the gate transistor Q23. Further, a clamping diode, or diodes, may be used at the last said amplifier to avoid overtaxing the amplifier. And lastly, an integrated circuit differential amplifier may be substituted for the transistors Q18 and Q19.

SIGNAL-SWITCHING PULSE DISTRIBUTOR IN FIG. 15

In reference to the arrangements given in FIGS. 8, 9 and 10, the accuracy of the system depends upon an almost perfect fundamental frequency selector, which may not perform perfectly at all times. Rather than depending upon the perfect performance of the fundamental frequency selector, however, it is also possible to obviate the time measurement of any wavelength, and perform sequentially all the possible combinations of signal regrouping after selection of each peak of the souund wave, whether the said peak selection had occurred at the pitch period, the fundamental period, or any other erroneous period. As exemplified by the chart given in FIG. 13, 28 combinations will cover all the requirements of satisfactory operation, which does not need very high speed distribution of signals. For example, if a time period of 2,000 microseconds is allowed after selection of each peak for the formation of 28 different combinations, the time of which is much shorter than the shortest time interval within which a good peak selector can make an error, the time allowed for each step of the said combinations will be 18 microseconds, which is long enough for the designer to select only medium frequency component parts (transistors) in designing the circuitry.

In the arrangement of FIG. 15, the voice sound wave in block 191 is applied to the peak selector in block 192, the peak pulses of the latter of which are further applied to the distributor in block 193. The output terminals of 193 are distributed to the gate electrodes on the analog switches in FIG. 10, through the sets of coupling capacitors C34 through C49. These pulses are also applied to the series connected gate transistor Q24 in FIG. 14, which is required for the operation of the circuit in FIG. 14.

The distributor circuit in block 193 may be of any conventional type that may be suitable for the purpose. It may also be arranged by a number of one-shot circuits sequentially coupled one to another, so that when the first one is operated from normal to active state by the distribution pulse from the block 193, it will apply an operating pulse to the second one-shot during return from its active to normal state, and so on, up to the $n$th one-shot, which ends the sequential operation until another pulse arrives at the first one-shot from the block 192. The outputs of these one-shot circuits are then applied to the gates coupling capacitors C34 through C49. In the arrangement of FIG. 16, the voice sound wave in block 191 is first amplitude equalized in block 198 before being applied to the passband filters, so as to reduce as much as of the variations in the original sound wave as possible. This amplitude equalizer is also desirable to be used in conjunction with other arrangements disclosed herein. Amplitude equalization of sound waves has been practiced conventionally, but the circuit arrangements as disclosed in my previous patents and patent applications may be used satisfactorily, for example, in my U.S. Pat. No. 3,265,984 Aug. 9, 1966.

In reference to the circuit arrangement given in FIG. 14, it has been described that the various signal amplitudes of the group of frequency components representing a sound information are analyzed by the amplitude ratios between these different signals. This analysis is not limited to only ratio measurements, however, and discrete amplitude measurements may also be used, if so desired, such as is practiced in some presently experimental devices for information recognition. FIG. 16 shows one arrangement, wherein, the detected outputs from the various passband filters may be analyzed in discrete amplitude levels in the analyzer block 199, for example, by the arrangement disclosed in H.F. Olsen et al. U.S. Pat. No. 2,971,057 Feb. 7, 1961,

DETECTOR CIRCUIT ARRANGEMENT OF FIG. 17

It has been described in the foregoing that the information carrying wave is analyzed right after selection of a peak of the original sound wave. This performance requires that all of the signal components at different frequencies of the sound wave are sampled and made ready for the grouped analysis just before the said peak is selected. It is therefore desirable that the detected signals are stored across high impedance devices for retaining the stored quantity of the signal, and dissipate it by force either completely or partly after each analytical performance, so that the succeeding signals may be stored in successive order. One way of performing such periodic or random storage and dissipation is shown by the arrangement in FIG. 18, wherein, the sound wave across the secondary coil of the transformer T1 is full-wave rectified by the diodes D33 and D34, and applied to the storage capacitor C50 in series with the switching transistor Q27, and resistor R36. The gate transistor Q27 is normally biased to conductive state by the negative supply voltage applied to its gate electrode in series with the resistor R37, thus the capacitor C50 is being always in a charging state. When the charge across C50 is to be dissipated during a short pulse period, however, the parallel connected transistor Q28 is made conductive from its normal nonconductive state, which causes discharge of the capacitor C50 in series with the resistor R36. During this discharge pulse period, the transformer I1 is prevented from being short-circuited by rendering the transistor Q27 nonconductive. The discharging pulse may be taken from the output of the delay circuit in block 176, in FIG. 9. The series connected resistor R36 is shown for preventing complete discharge of C50, but it may be dispensed with if so desired. Also, the combination of transistors shown in FIG. 17 represents one of the various types presently available integrated circuits, and therefore, it may be readily utilized for the purpose herein.

While several preferred embodiments of the invention have been selected to describe the invention in detail, it is obvious to those skilled in the art that they may be considered as exemplary, and that the invention is not limited in its utility. Similarly, and according to the various examples given with each of the diagrammatic arrangements disclosed herein, it is obvious that various modifications, adaptations, and substitutions of parts may be made without departing from the true spirit and scope of the invention.

What I claim, is:

1. The system for analyzing speech sound waves in which the quality of sound and phonetic information are contained within one-wavelength time periods varying glottal pitch and vocal cord fundamental frequencies, the latter of which are at least equal to or higher than the pitch frequencies, and in which the phonetic information is contained in a group of resonance peaks lying in a frequency band above the vocal cord fundamental frequency, as identified by the frequency and amplitude ratios one with respect to another in a group, the system comprising means for dividing said sound wave into a plurality of subbands and means for deriving therefrom a plurality of detected signals in proportional amplitudes, respectively; a matrix comprising plurality of groups of signal-amplitude-ratio matching means; a plurality of combinations of groups of coupling means from the said plurality of detected signals to the plurality of groups of said matching means, each one of the combinations of groups so arranged that, the detected signal derived from the lowest subband frequency in a group lies in a region above the signal that is derived from a subband responsive to said vocal cord fundamental frequency; and means for deriving a closest matching signal from a group of said matching means as an identification of the phonetic information.

2. The system as set forth in claim 1, wherein said means for dividing said sound wave into a said plurality of detected signals comprise a plurality of passband filters through which are passed said sound wave for obtaining said subbands at their outputs; a plurality of network arrangements each network comprising rectifying diodes, a series-shunt switch, and a capacitor, at the outputs of said plurality of filters, respectively, each of the series-shunt switches having a control means for either connecting the rectified output of the filter to the capacitor associated therewith for storage in proportional signal quantity, or shunting said capacitor for discharge of storage; means for producing pulse signals at some repeating time intervals during switch said frequency variations of said sound wave may occur; and means for applying said pulse signals to the control means of said plurality of switches simultaneously for effecting discharge of said capacitors after said matching signals have been derived.

3. In a system for analyzing speech sound wave in which the quality of sound and phonetic information are contained within varying one-wavelength time periods of the pitch glottal vocal cord and fundamental frequencies, the latter of which are at least equal to or higher than the glottal pitch frequencies, and in which the phonetic information is contained in a group of resonance peaks lying in a frequency band above the fundamental frequency, as identified by the frequency and amplitude ratios one with respect to another in a group, the system for cancelling out the glottal pitch and vocal cord fundamental frequency components from the sound wave by separating the glottal pitch and vocal cord fundamental components from the components representing the phonetic information comprising means for dividing said sound wave into a plurality of subbands and means for deriving therefrom a plurality of detected signals in proportional amplitudes respectively; means for producing signal quantities as functions of one-wavelength time periods of said vocal cord fundamental frequencies; a plurality of channels, each channel having an input and an output; a plurality of normal "on" switching means; means for coupling said detected signals in series with said plurality of switching means to the inputs of said channels for admittance to their outputs, respectively; coupling means from said signal amplitudes to said plurality of switching means in an arrangement that, those switching means that pass the detected signals derived from subbands of the said vocal cord fundamental and glottal pitch frequencies are rendered in "off" operating states by removing from the outputs of said channels those detected signals that are derived from the glottal pitch and vocal cord fundamental subbands; and means for selecting a group of signals from the remaining signals at the outputs of said channels, having the desired mutually related frequency ratio separations in the said subbands from which they had been derived, as representations of the phonetic information.

4. In speech sound waves containing phonetic information waves, varying glottal pitch frequency waves, and varying vocal cord fundamental frequency waves, and wherein the glottal pitch and vocal cord fundamental frequency waves are distinguishable and wherein also the phonetic information is determined by waves having approximately specific mutually related frequency ratio separations in the sound spectrum the method of determining in the sound waves those waves that represent the phonetic information comprising the steps of determining the glottal pitch and vocal cord fundamental frequency waves in the speech sound waves by first differentiating between the glottal pitch and vocal bord fundamental frequency waves from the rest of the waves; and by determining from said rest of the waves those waves having approximately specific mutually related frequency ratio separation in the sound spectrum for representing the phonetic information aforesaid.

5. The method as set forth in claim 4, wherein is included the step for standardizing said variations in frequency regions of the frequency waves in the sound spectrum, in an order that a reference increment of some parameter represents the lowest frequency of said determined waves are represented by further increments of said parameter whose frequencies differ from the reference increment by the same factor of multiplication as the other frequencies differ from the waves having the lowest frequency in said rest of the waves, whereby standardizing the frequency variations of those waves representing the phonetic information.

6. In speech sound waves containing phonetic information waves, varying glottal pitch frequency glottal waves, and varying vocal cord fundamental frequency waves, and wherein the glottal pitch and vocal cord fundamental frequency waves are distinguishable, and wherein also the phonetic information is determined by waves having approximately specific mutually related frequency ratio separations in the sound spectrum, and further yet by approximate specific magnitude ratio relations one with another, the method of determining in the sound wave those wave that represent the phonetic information comprising the steps of determining the glottal pitch and vocal cord fundamental frequency waves by way of their distinguishability by first differentiating between the glottal pitch and vocal cord fundamental frequency waves from the rest of the complex of waves; determining from said rest of the waves those waves having approximately specific mutually related frequency ratio separations in the sound spectrum; and comparing approximately the mutual magnitude ratio relations of said determined waves with that of specific quantity ratio standards, for determining if said determined waves are the correct ones for representing the specific phonetic information.

7. The method as set forth in claim 6, wherein is included the step of standardizing said variations in frequency regions of the frequency waves in the sound spectrum, in an order that a reference increment of some parameter represents the lowest frequency of said determined rest of the waves and the other frequencies of last said determined waves are represented by further increments of said parameter whose frequencies differ from the reference increment by the same factor of multiplication as the other frequencies differ from the waves having the lowest frequency in said rest of the waves, whereby standardizing the frequency variations of those waves representing the phonetic information.

8. In a system for analyzing speech sound waves in which the quality of sound and phonetic information are contained within one wavelength time periods of the varying glottal pitch and vocal cord fundamental frequencies, the latter of which are at least equal to or higher than the glottal pitch frequencies, and in which the phonetic information is contained in a group of resonance peaks lying in a frequency band stove above the vocal cord fundamental frequency, the system comprising means for dividing the resonant components of the sound wave into a plurality of subbands; means for deriving from each of the divided subbands a plurality of detected signals; a bank of channels in a numerical order, starting from channel-1; a plurality of normally "off" switching means; coupling means from the plurality of detected signals to the said channels via said plurality of switching means in an arrangement that, in each combination the detected signal derived from the lowest frequency component from said subbands is coupled to the channel-1, while the other detected signals are coupled to the other channels by the same factor of multiplication from channel-1 as the other subband frequencies differ from the lowest subband frequency; means for producing a plurality of control signals, each signal representing a specific one wavelength time period of said varying vocal cord fundamental frequencies; coupling means from said control signals to said switching means for "on" states, each control signal assigned for operation of a specific combination of said signal couplings to said channels in a order that, the signal representing a higher frequency than the vocal cord fundamental frequency in said subbands is switched to the number 1 channel; and means for selecting a group of signals from said channels adaptable to be converted into some parameter as a representation of said phonetic information.

9. The system as set forth in claim 8, wherein is included a plurality of groups of signal-amplitude-ratio matching means; for coupling said selected group of signals to said plurality of matching means, and means for deriving a closest matching signal from one of said matching means as a representation of said phonetic information 10. The system as set forth in claim 8, wherein is included apparatus for producing said control signal, comprising means for producing first pulses representative in repetition rate of said vocal cord fundamental frequency; an alternately operating switching means; means for applying the first pulses to said switching means; for producing alternate steady state signals in opposite polarities; means for deriving alternately poled second pulses from said steady state signals, respectively; first and second capacitors; first and second discharger means associated with the first and second capacitors, respectively; means for applying said second pulses to the first and second discharger means alternately for discharging in said first and second capacitors previously stored signal quantities; first and second charging means for charging the first and second capacitors, respectively, at a predetermined charging rate; means for applying said steady state signals to said first and second charging means alternately for charging in signal quantities representative of the time periods between said steady state signals; means for dividing the stored quantities of the first and second capacitors into equally defined control signals; means or mixing signals of said equally defined control signals; and coupling means from said mixed control signals to said plurality of switching means.

* * * * *